(12) United States Patent
Ikeda

(10) Patent No.: US 7,860,030 B2
(45) Date of Patent: Dec. 28, 2010

(54) COMMUNICATION SYSTEM TO FORM COMMUNICATION NETWORK FOR COMMUNICATION APPARATUSES

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 11/745,977

(22) Filed: May 8, 2007

(65) Prior Publication Data

US 2007/0297347 A1    Dec. 27, 2007

(30) Foreign Application Priority Data

Jun. 23, 2006    (JP) .............................. 2006-174134

(51) Int. Cl.
*H04L 12/28* (2006.01)
(52) U.S. Cl. ...................... 370/255; 370/386
(58) Field of Classification Search ................ None
See application file for complete search history.

(56) References Cited

U.S. PATENT DOCUMENTS

| | | | |
|---|---|---|---|
| 6,014,406 A | 1/2000 | Shida et al. | |
| 2002/0044549 A1* | 4/2002 | Johansson et al. | 370/386 |
| 2002/0075940 A1* | 6/2002 | Haartsen | 375/132 |
| 2002/0142789 A1* | 10/2002 | Kuhl et al. | 455/512 |
| 2002/0196029 A1* | 12/2002 | Schmidt | 324/500 |
| 2003/0012173 A1* | 1/2003 | Rune | 370/344 |
| 2003/0031208 A1* | 2/2003 | Anehem et al. | 370/474 |
| 2003/0091015 A1 | 5/2003 | Gassho et al. | |
| 2005/0054342 A1 | 3/2005 | Otsuka | |
| 2005/0223102 A1 | 10/2005 | Zhang et al. | |

FOREIGN PATENT DOCUMENTS

| | | | |
|---|---|---|---|
| JP | 8298687 A | 11/1996 |
| JP | 11275106 A | 10/1999 |
| JP | 2003143156 A | 5/2003 |
| JP | 2004266653 A | 9/2004 |
| JP | 200586350 A | 3/2005 |
| JP | 2005323346 A | 11/2005 |

\* cited by examiner

*Primary Examiner*—Jayanti K Patel
*Assistant Examiner*—Hooman Houshmand
(74) *Attorney, Agent, or Firm*—Canon USA, Inc. IP Division

(57) ABSTRACT

In a communication system including a plurality of communication apparatuses, each communication apparatus has a first operation mode in which the communication apparatus controls communication of other communication apparatuses and a second operation mode in which the communication apparatus operates under the control of another communication apparatus. A network independent of an existing network is formed by switching the operation mode of one of communication apparatuses into the first operation mode.

13 Claims, 25 Drawing Sheets

FIG. 10

| E1001 | E1002 | E1003 | E1004 | E1005 | E1006 | E1007 | E1008 |
|---|---|---|---|---|---|---|---|
| ADAPTER ID | MAC ADDRESS | MAXIMUM RATE | GROUP SETTING CAPABILITY | I/O TYPE | DEVICE | I/F | TRANSFER MODE |
| 101 | 00:00:85:00:01:01 | 54 | ○ | I | TUNER | IEEE1394 | ISOCHRONOUS |
| 102 | 00:00:85:00:01:11 | 54 | ○ | I | HDR | WIRED LAN | ACCORDING TO 802.1p |
| 103 | 00:00:85:00:01:21 | 24 | ○ | I | DVC | USB | ISOCHRONOUS |
| 104 | 00:00:85:00:01:31 | 54 | ○ | O | DISP | IEEE1394 | ISOCHRONOUS |
| 105 | 00:00:85:00:01:41 | — | × | — | — | — | — |
| 106 | 00:00:85:00:01:51 | — | × | — | — | — | — |
| — | — | — | — | — | — | — | — |

FIG. 22

| ADAPTER ID | MAC ADDRESS | MAXIMUM RATE | GROUP SETTING CAPABILITY | I/O TYPE | DEVICE | I/F | TRANSFER MODE |
|---|---|---|---|---|---|---|---|
| E1001 | E1002 | E1003 | E1004 | E1005 | E1006 | E1007 | E1008 |
| STA 1 | 00:00:85:00:01:01 | 54 | ○ | I | TUNER | IEEE1394 | ISOCHRONOUS |
| STA 2 | 00:00:85:00:01:11 | 54 | × | I/O | HDR | WIRED LAN | ACCORDING TO 802.1p |
| STA 3 | 00:00:85:00:01:21 | 24 | × | I/O | DVC | USB | ISOCHRONOUS |
| STA 4 | 00:00:85:00:01:31 | 54 | ○ | O | DISP | IEEE1394 | ISOCHRONOUS |
| STA 5 | 00:00:85:00:01:41 | 24 | ○ | O | PC | WIRED LAN | ACCORDING TO 802.1p |
| STA 6 | 00:00:85:00:01:51 | 24 | ○ | O | PDA | — | — |
| — | — | — | — | — | — | — | — |

FIG. 25

| ESSID | GP1/GP2/OTHERS (ARBITRARY) |
|---|---|
| OPERATION MODE | STA/AP/NOT SPECIFIED |
| OPERATION COMMAND | TRANSMISSION START COMMAND ETC. |

COMMUNICATION SYSTEM TO FORM COMMUNICATION NETWORK FOR COMMUNICATION APPARATUSES

BACKGROUND OF THE INVENTION

1. Field of the Invention

The present invention relates to a communication system, a communication apparatus, a communication method for a communication apparatus, and a computer program.

2. Description of the Related Art

In the wireless LAN technology based on the IEEE802.11 standard, an increase in transmission rate has been achieved by the advent of an advanced version of IEEE802.11, such as IEEE802.11b or IEEE802.11g.

To support QoS (Quality of Service) for transmission of stream data, the IEEE802.11e standard has been established.

In the IEEE802.11 wireless LAN standards, two communication modes are allowed. In an infrastructure mode, wireless communication stations (hereinafter referred to as STA's) communicate with each other via a base station called an access point (hereafter referred to as an AP). In an ad hoc mode, two STAs are allowed to directly communicate with each other.

In the IEEE802.11e standard, DLS (Direct Link Set-up) is defined for direct communication between STAs under control of an AP in the infrastructure mode.

In general, direct communication between STAs is more efficient than indirect communication via an AP. Additional efficiency is desirable in particular in transmission of stream data.

For further detailed descriptions, see, for example, Japanese Patent Laid-Open No. 11-275106, Japanese Patent Laid-Open No. 2004-266653, or Japanese Patent Laid-Open No. 2005-323346.

In conventional techniques, to switch a plurality of communication apparatus communicating with each other in the infrastructure mode into the ad hoc mode, a user has to perform an operation using a setting application program or the like to switch the mode for each communication apparatus. This is very inconvenient for users.

In direction communication using the DLS, if a communication band available on an existence network becomes insufficient, it is impossible to control communication band based on the QoS.

SUMMARY OF THE INVENTION

The present invention provides a technique to adaptively form a network independent of an existing network so that communication apparatuses are allowed to communicate with each other via the newly formed network.

More specifically, the present invention provides a communication system including a plurality of communication apparatuses, each communication apparatus having a first operation mode in which the communication apparatus controls communication of other communication apparatuses and a second operation mode in which the communication apparatus operates under the control of another communication apparatus, a first communication apparatus of the plurality of communication apparatuses including a communication unit configured to communicate, in a first network, with another communication apparatus via a control apparatus, and an instructing unit configured to instruct a second communication apparatus, which is present within the first network and which communicates under the control of the control apparatus, to operate in a specified operation mode in a second network, the second communication apparatus including an instruction detecting unit configured to detect the instruction specifying the operation mode in the second network given by the first communication apparatus, wherein either one of the first communication apparatus or the second communication apparatus switches into the first operation mode thereby forming the second network.

The present invention also provides a communication apparatus having a first operation mode in which the communication apparatus controls communication of other communication apparatuses and a second operation mode in which the communication apparatus operates under the control of another communication apparatus, including a communication unit configured to communicate, in a first network, with another communication apparatus via a control apparatus, an instructing unit configured to instruct a second communication apparatus, which is present within the first network and which communicates under the control of the control apparatus, to operate in a specified operation mode in a second network, and a network forming unit configured to form a second network with the second communication apparatus, whereby either one of the first communication apparatus or the second communication apparatus switches into the first operation mode thereby forming the second network.

The present invention also provides a communication apparatus having a first operation mode in which the communication apparatus controls communication of other communication apparatuses and a second operation mode in which the second communication apparatus operates under the control of another communication apparatus, including a communication unit configured to communicate, in a first network, with another communication apparatus via a control apparatus, an instruction detecting unit configured to detect an instruction specifying an operation mode in a second network, given by a second communication apparatus which is present within the first network and which communicates under the control of the control apparatus, and a network forming unit configured to form a second network with the first communication apparatus, whereby either one of the first communication apparatus or the second communication apparatus switches into the first operation mode to form the second network.

Thus, the present invention provides an advantage in that a network independent of an existing network is formed by controlling the operation modes of communication apparatuses each having the first operation mode in which a communication apparatus controls communication of other communication apparatuses and the second operation mode in which the communication apparatus operates under the control of another communication apparatus such that one of the communication apparatuses into the first operation mode to form the network, whereby, for example, even when a communication band available in the existing network becomes insufficient, a new network can be formed as required.

BRIEF DESCRIPTION OF THE DRAWINGS

FIG. 10 illustrates an information management table according to an exemplary embodiment of the present invention.

FIG. 22 illustrates an information management table according to an exemplary embodiment of the present invention.

FIG. 25 illustrates the details of group setting information.

Further features of the present invention will become apparent from the following description of exemplary embodiments with reference to the attached drawings.

DETAILED DESCRIPTION OF THE EMBODIMENTS

Figure 1:
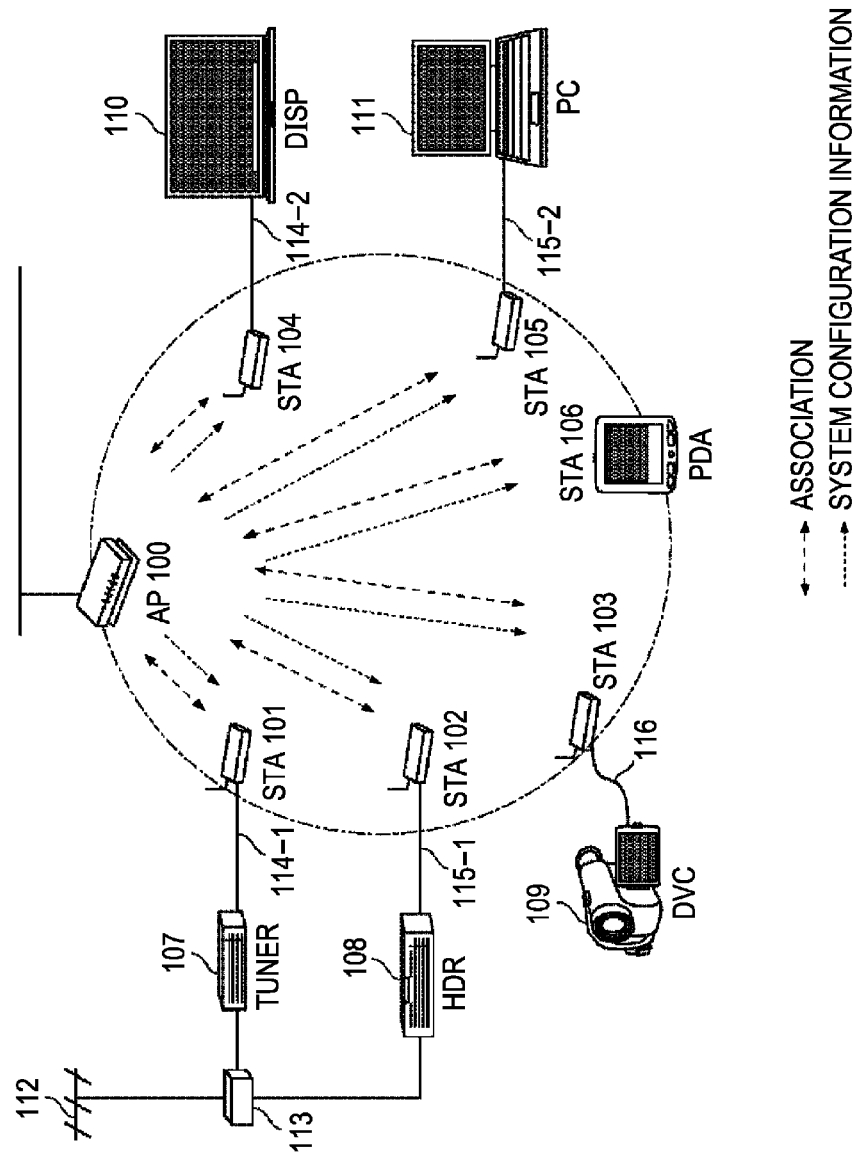
FIG. 1 is a diagram illustrating an example of a network configuration according to an exemplary embodiment of the present invention.

FIG. 1 is a diagram illustrating an example of a network configuration according to an exemplary embodiment of the present invention.

The wireless network includes wireless stations (hereinafter referred to as STAs) 101 to 106 and a wireless access point (hereinafter referred to as an AP) 100.

The AP is a control apparatus adapted to control STAs in a wireless service area. When STA's perform wireless communication in the service area, data is transmitted via the AP.

Each STA is allowed to communicate with another STA under the control of the AP. As will be described in further detail below, when an STA initiates a communication, the STA first associates (connects) with the AP so that the STA becomes capable of communicating with the AP.

STAs 101 to 105 are respectively connected to input/output devices 107 to 111 and serve as wireless adapters for the input/output devices 107 to 111. An STA 106 is a device (PDA) capable of performing wireless communication without needing an adapter.

The STA 101 is connected to a tuner 107 via an IEEE1394 cable 114-1. The STA 102 is connected to a hard disk recorder (HDR) 108 via a wired LAN cable 115-1. The STA 103 is connected to a digital video camera (DVC) 109 via a USB cable 116. The STA 104 is connected, via an IEEE1394 cable 114-2, to a television set (DIPS) 110 such as a liquid crystal television set. The STA 105 is connected to a notebook-type personal computer (PC) 111 via a wired LAN cable 115-2. The STA 106 is a wireless communication station such as a PDA device having a built-in input/output device capable of being used without needing an interface.

The AP 100 is an access point capable of supporting the QoS. When wireless communication is performed between two of STAs 101 to 106 within a wireless communication service area of the AP 100, packets are transmitted via the AP 100. The AP 100 is connected to the Internet and/or an intranet whereby the AP 100 relays packets when any of STAs 101 to 106 accesses the Internet or the intranet.

In FIG. 1, reference numeral 112 denotes a broadcast receiving antenna, and reference numeral 113 denotes a divider adapted to distribute a signal received by the broadcast receiving antenna 112 to the tuner 107 and the hard disk recorder 108.

Figure 2:
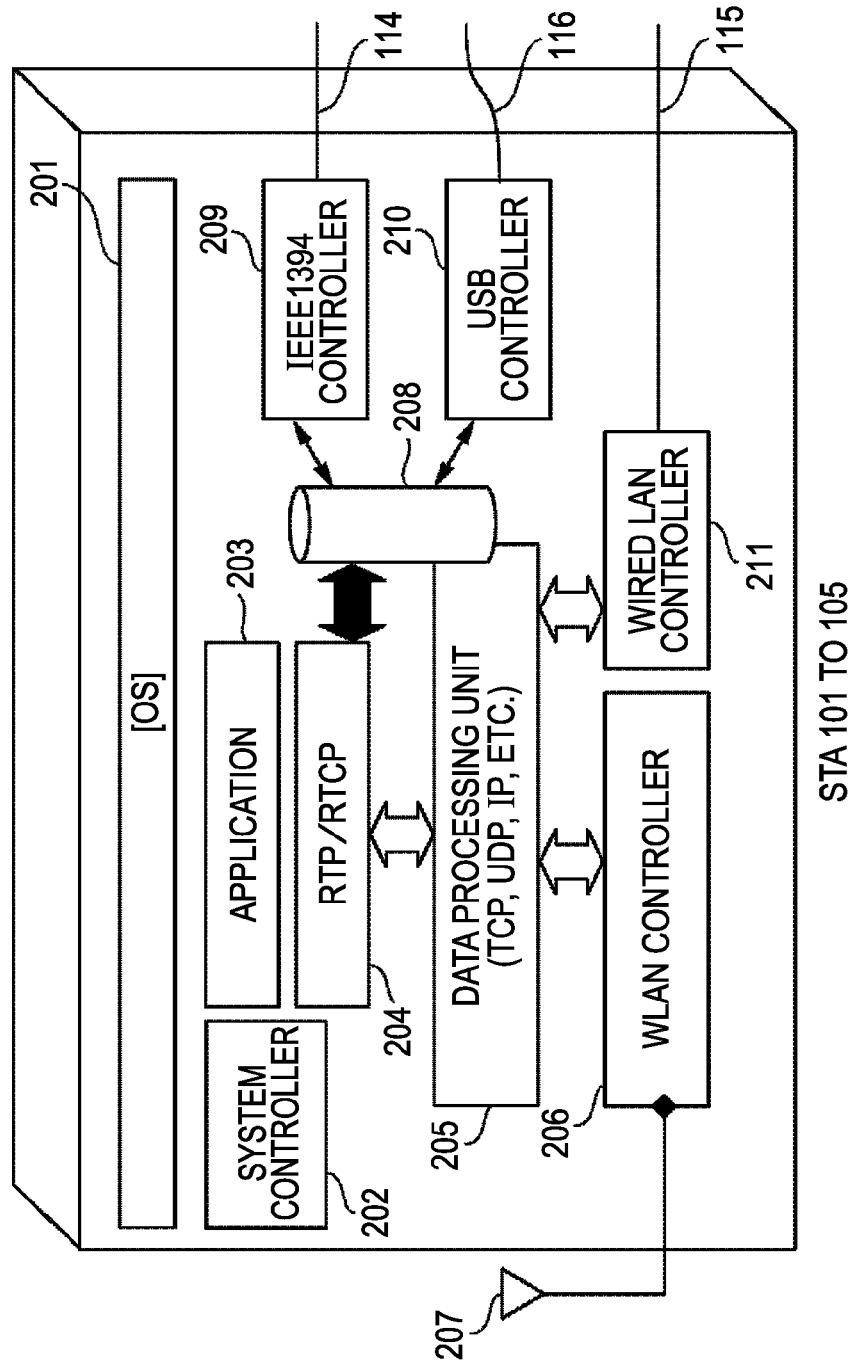
FIG. 2 is a diagram illustrating an example of an internal software configuration of a wireless communication station according to an exemplary embodiment of the present invention.

FIG. 2 illustrates an internal software configuration of the STAs 101 to 105 according to an embodiment of the present invention. Note that the STAs 101 to 105 have a similar software configuration, and thus the following description is given in a generic manner unless a description of a particular STA is necessary.

In FIG. 2, reference numeral 202 denotes a system controller responsible for general control of an STA (i.e., one of the STAs 101 to 105). Reference numeral 203 denotes an application program selected depending on the specific type of an input/output device (i.e., one of the input/output devices 107 to 111) connected to the STA.

Reference numeral 204 denotes a QoS protocol processing unit realized in a cession layer such as RTP (Real-time Transport Protocol) or RTCP (RTP Control Protocol). Reference numeral 205 denotes a network protocol data processing unit adapted to process data such as TCP (Transmission Control Protocol) data, UDP (User Datagram Protocol) data, or IP (Internet Protocol) data.

Reference numeral 206 denotes a wireless LAN (WLAN) controller. Reference numeral 207 denotes an antenna which is connected to the wireless LAN (WLAN) controller 206 and which is used to transmit/receive data to/from another STA (one of STAs 101 to 105).

Reference numeral 209 denotes an IEEE1394 controller connected to, for example, a tuner 107 or a television set (DISP) 110 via an IEEE1394 cable 114. Reference numeral 210 denotes a USB controller connected to, for example, a digital video camera (DVC) 109 via a USB cable 116.

Reference numeral 211 denotes a wired LAN controller connected to, for example, a hard disk recorder (HDR) 108 or a notebook-type personal computer (PC) 111 via a wired LAN cable 115.

Reference numeral 208 denotes a storage unit used by the system controller 202, the application 203, the QoS protocol processing unit 204, the network protocol data processing unit 205, and interface controllers 206, 209, 210, and 211.

The software function blocks 202 to 206 and 209 to 211 described above are stored in the form of programs and associated parameters in a read only memory (ROM). Programs and/or data are temporarily stored, as required, in the storage unit 208 in the form of a random access memory (RAM) from the ROM. Reference numeral 201 denotes an operating system (OS) which is software adapted to control the ROM, the RAM, and the CPU.

Figure 3:
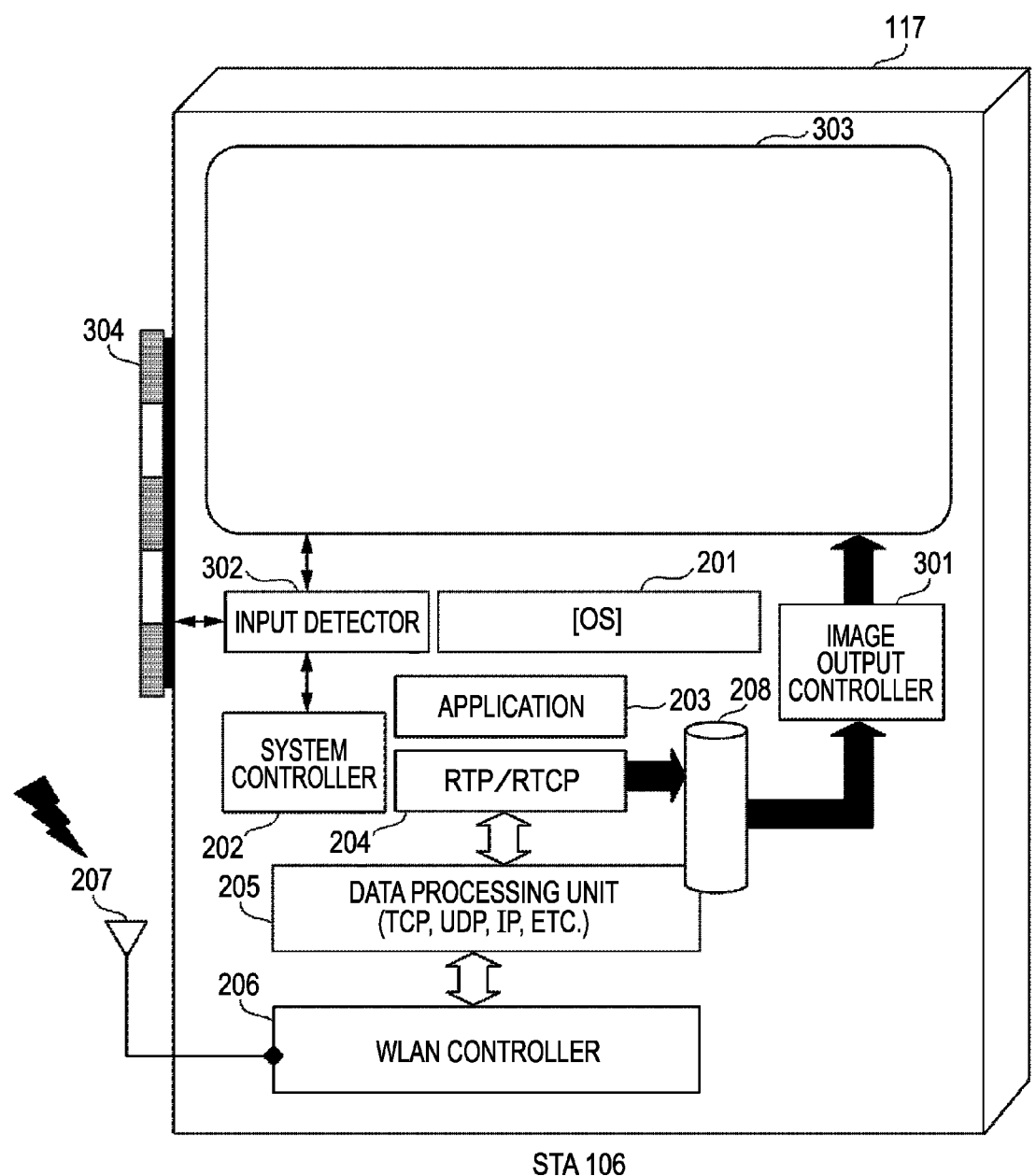
FIG. 3 is a diagram illustrating an example of an internal software configuration of a wireless communication station according to an exemplary embodiment of the present invention.

FIG. 3 illustrates an internal software configuration of the STA 106 according to an embodiment of the present invention.

In FIG. 3, parts 201 to 208 are similar to those of STAs 101 to 105 illustrated in FIG. 2, and thus a duplicated explanation thereof is omitted herein.

Reference numeral 303 denotes a liquid crystal display. Reference numeral 301 denotes an image output controller adapted to convert data received from another STA or control information generated in the STA 106 into image data and outputs the resultant image data to the liquid crystal display 303.

Reference numeral 304 denotes an input unit including various switches. Reference numeral 302 denotes an input detector adapted to detect an input operation performed on the input unit 304.

Figure 4:
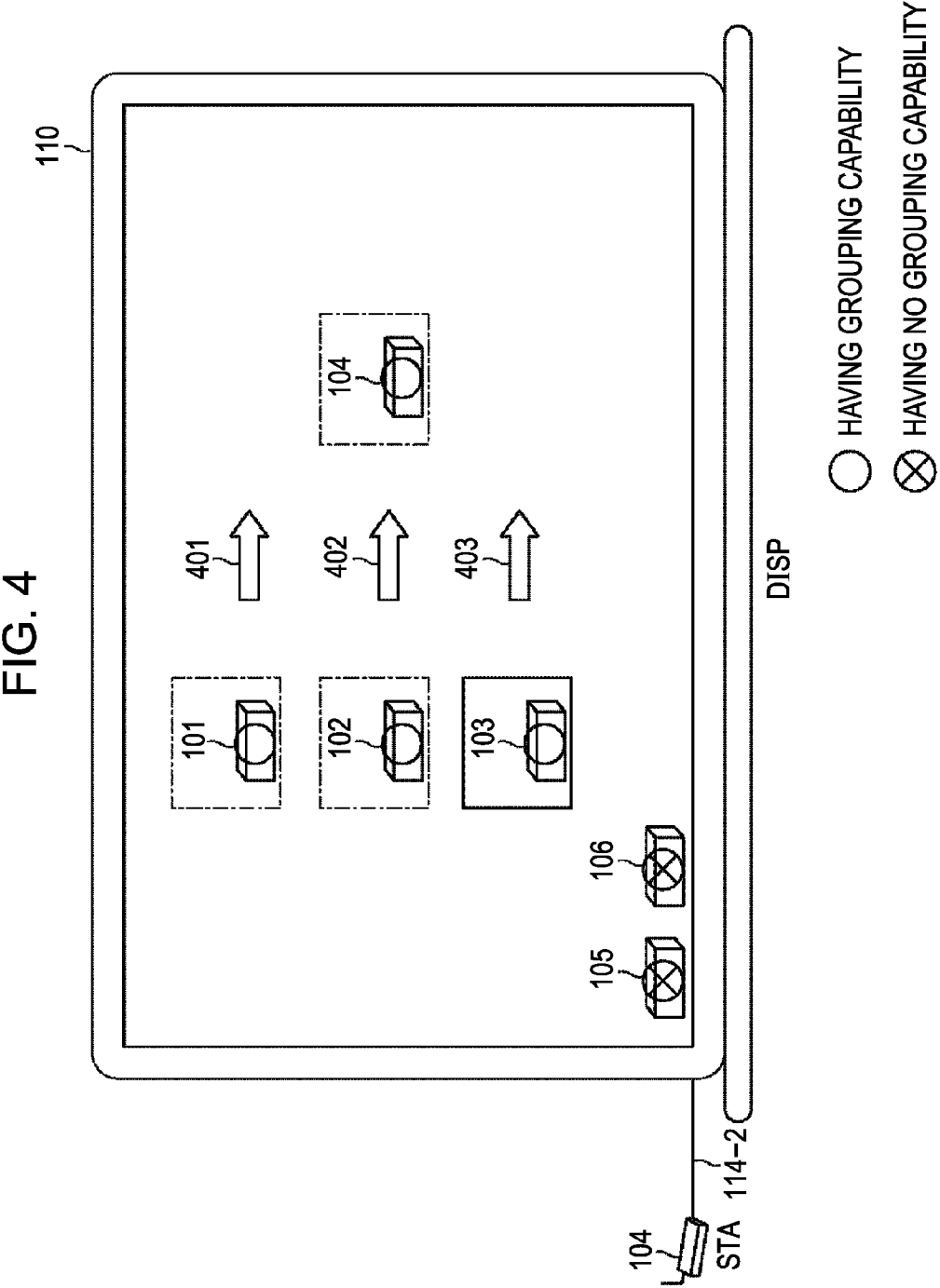
FIG. 4 is a diagram illustrating an example of an image displayed on a display screen of a television set according to an exemplary embodiment of the present invention.

FIG. 4 illustrates an example of an image displayed on the display screen of the television set 110 connected to the STA 104 according to a first exemplary embodiment of the present invention. In this specific example, it is assumed that the STAs 101 to 106 have completed association with the AP 100.

Herein, the association refers to a procedure performed by an STA to establish a connection with an AP. Via the association process, correspondence between an STA and an AP is uniquely determined and it becomes possible for the STA to perform a communication via the AP. In the association process, first, an STA transmits an association request to an AP. The association request includes information indicating capabilities of the STA and communication parameters such as a network identifier. If the AP receives the association request, the AP analyzes the communication parameters, assigns an association identifier (AID), and returns an association response to the STA.

When the association response includes information indicating that the association is successful, the STA determines that the STA has successfully associated with the AP. When the association response does not include information indicating that the association is successful, or when no association response is returned within a predetermined period, the STA determines that the association with the AP has failed. Note that the term "association" is also used in a similar manner elsewhere in the present description.

On the display screen of the television set 110, the STAs 101 to 106 present within the network are displayed in the form of icons in such a manner that the communication capabilities thereof are displayed. In the example illustrated in FIG. 4, the icons are displayed such that a user can know whether the respective STAs have a capability of forming a network (i.e., a group) independent of an existing network.

Herein, the group-forming capability refers to a capability of switching the operation mode between an AP mode in which an STA operates as an AP and an STA mode in which the STA operates as an STA. Hereinafter, this capability will be referred to also as a dual-mode capability.

An STA operating in the AP mode forms a group with STAs operating in the STA modes so as to make it possible to perform communication within the group. The STA operating in the AP mode controls communication between STAs operating in the STA mode in the group. The STAs operating in the STA mode perform communication under the control of the STA operating in the AP mode.

The STA operating in the AP mode is capable of relaying wireless communication between STAs operating in the STA mode. The STA operating in the AP mode is also capable of directly communicating with an STA operating in the STA mode in the group.

When an STA does not have the AP mode and is capable of operating only in the STA, the STA does not have the capability of forming a group.

In FIG. 4, arrows 401 to 403 indicate directions in which stream data is transmitted. In this specific example, the arrows 401 to 403 indicate that the STAs 101 to 103 are allowed to transmit stream data to the STA 104.

The STAs 101 to 104 have the dual mode capability and thus are capable of forming a group. The STAs 105 and 106 does not have the dual mode capability and are not capable of forming a group. As will be described in further detail below, if a user selects one of icons corresponding to the STAs 101 to 103, a group is formed between the selected STA and the STA 104.

Figure 5:
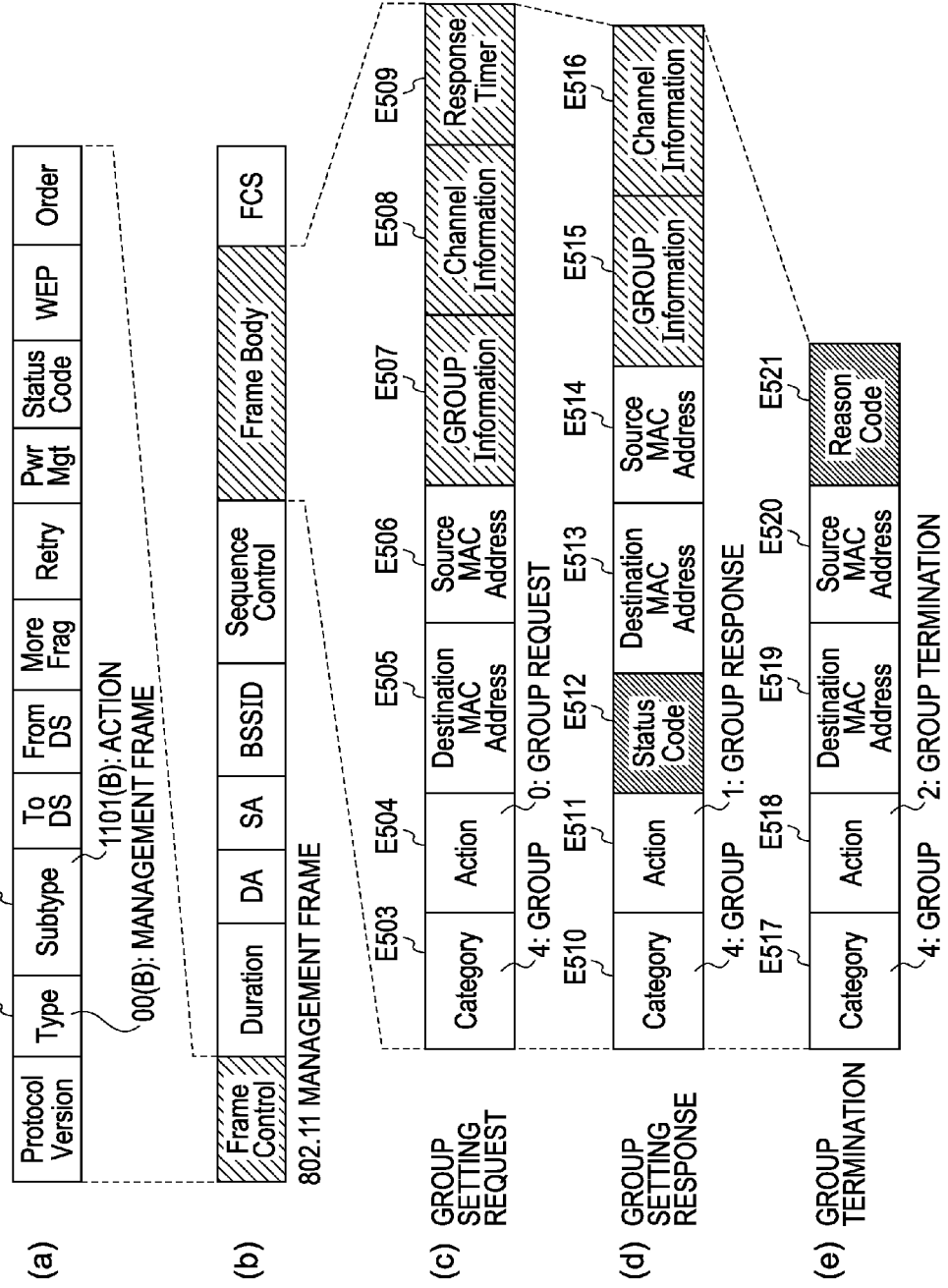
FIG. 5 is a diagram illustrating a message format according to an exemplary embodiment of the present invention.

FIG. 5 illustrates a MAC frame structure of a wireless LAN packet transmitted between STAs or between an STA and an AP according to the present embodiment.

In this figure, (b) illustrates the entire structure of a MAC frame, and (a) illustrates a frame control field in the MAC frame.

Reference numeral E501 denotes an information element indicating a MAC frame type. In the specific example illustrated in FIG. 5, the information element E501 has a value of "00" indicating a management frame.

Reference numeral E502 denotes an information element indicating a subtype of the MAC frame. In this specific example, the information element E502 has a value of "1101" indicating "ACTION".

In FIG. 5, (c), (d), and (e) illustrate structures of a frame body field in the MAC frame. More specifically, (c) illustrates information elements in a group setting request message, (d) illustrates information elements in a group setting response, and (e) illustrates information elements in a group communication termination message.

Information elements described in fields E503, E510, and E517 indicate a message category. For a group setting message, these information elements are set to "4".

Information elements described in fields E504, E511, and E518 indicate a message type. These information elements are set to "0", "1", or "2" depending on whether the message is a group setting request message, a group setting response message, or a group communication termination message.

Information elements described fields in E505, E513, and E519 indicate a MAC address of a communication apparatus to which the message is sent. Information elements described in fields in E506, E514, and E520 indicate a MAC address of a communication apparatus from which the message is sent.

Information elements described in fields in E507 and E515 indicate various kinds of group setting information. The details of group setting information are illustrated in FIG. 25. The group setting information includes a network identifier called an extended service set identifier (ESSID) used in a formed group. The group setting information also includes an operation mode information specifying whether the STA should operate in the AP mode or the STA mode in the group communication.

The group setting information also includes an operation command indicating a start of stream data transmission. Although not illustrated in FIG. 25, the group setting information may further include communication parameters indicating an encryption method, an encryption key, etc.

When a communication apparatus transmits a group setting request, if it is specified to operate in the STA mode, the operation mode information is set to "STA". To specify the AP mode, the operation mode information is set to "AP". When the operation mode information is not changed, the operation mode information is set to "NOT SPECIFIED". Even when the operation mode information is set to "NOT SPECIFIED", it is possible to form a network independent of the existing network by changing the ESSID or the channel to a value assigned to the group.

When the group setting response is sent, the information described in the information element E507 in the received group setting request into the information element E515 of the group setting response.

Information elements E508 and E516 are respectively used to indicate a channel used in the group communication.

An information element E509 is used to describe a timeout value specifying a maximum waiting time of the group setting response message.

An information element E512 is used to describe a status code of the group setting response to indicate whether it is possible to form a group.

An information element described in a field E521 indicates a reason for group communication termination. For example, information indicating normal group communication termination is described in the information element E521.

Figure 6:
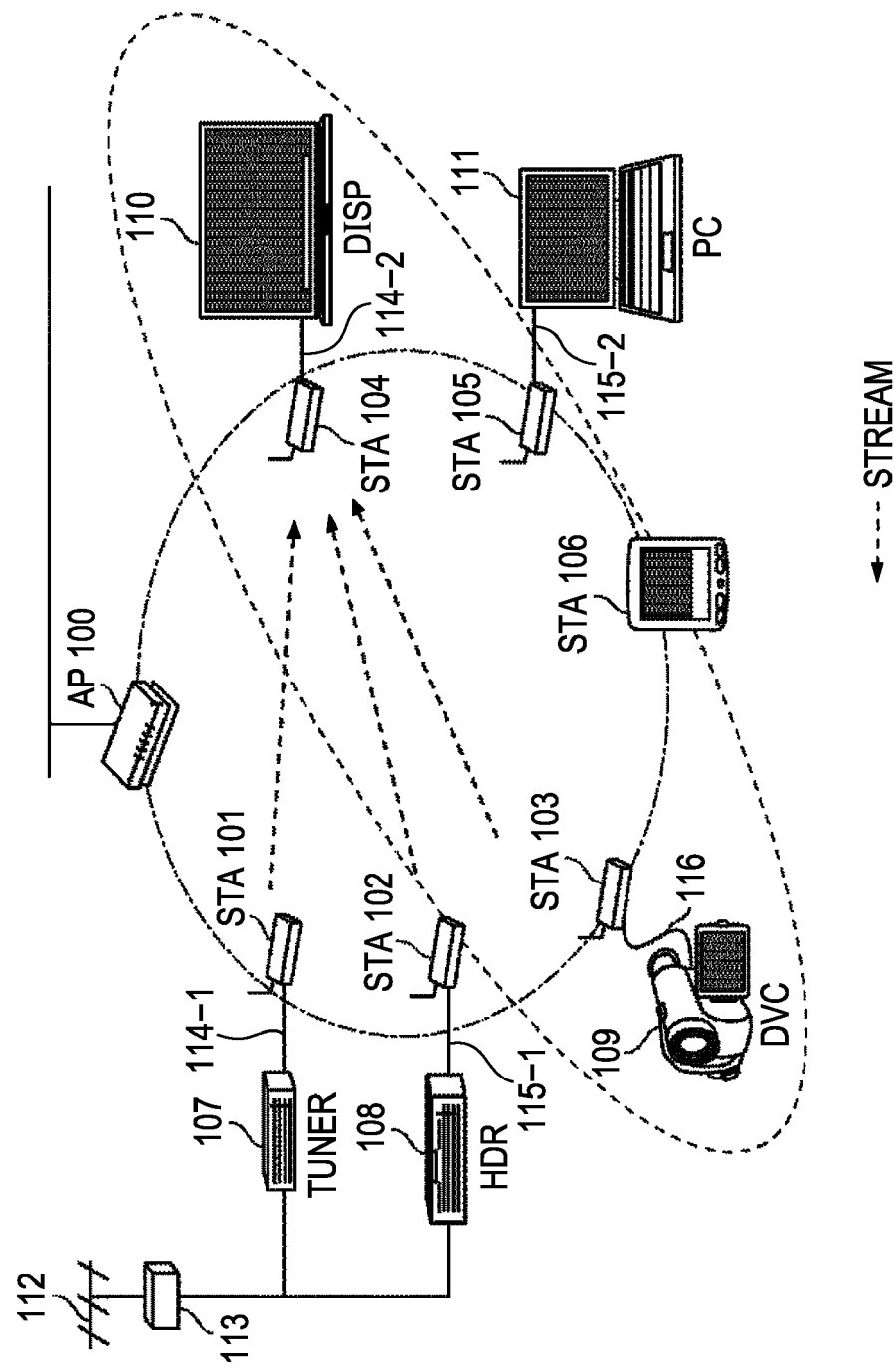
FIG. 6 is a diagram illustrating an example of a network configuration according to an exemplary embodiment of the present invention.

FIG. 6 illustrates an example of a network configuration according to the present embodiment of the invention.

Stream data transmission is performed between the STA 104 connected to the television set 110 and the STAs 101, 102, and 103 respectively connected to the tuner 107, the HDR 108, and the DVC 109. If the icon indicating the STA 103 is selected on the display screen of the television set 110 (FIG. 4) to form a group with the STA 103, a group setting sequence according to the present embodiment is performed.

Figure 7:
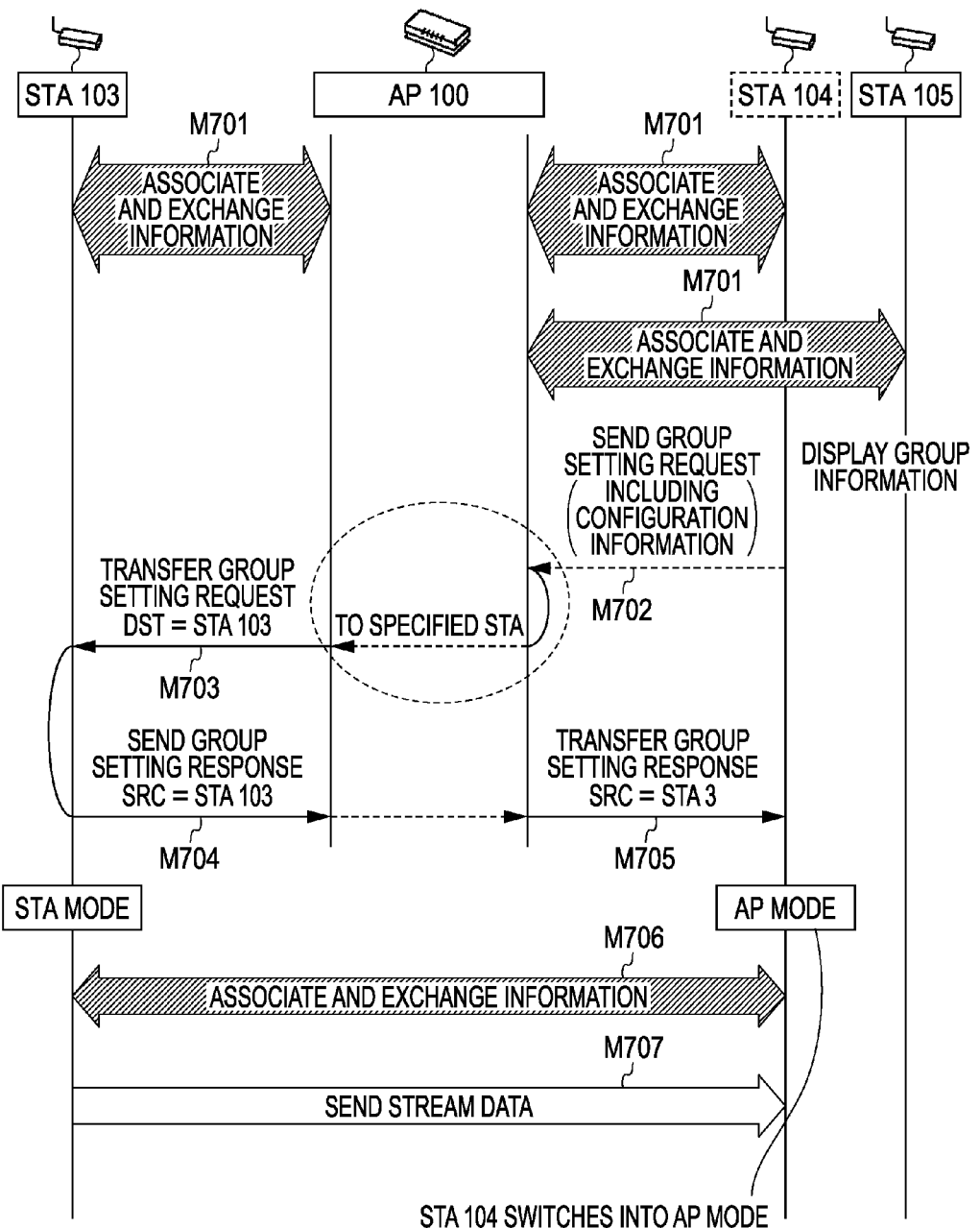
FIG. 7 illustrates an operation sequence according to an exemplary embodiment of the present invention.

FIG. 7 illustrates an operation sequence performed between STAs according to the present embodiment of the invention.

First, the association process is performed between the AP 100 and the STA 103, 104, or 105. In the association process, information associated with the capabilities, such as the capability of forming a group, is exchanged between STAs (M701). The capabilities of the respective STAs indicated in the exchanged information are displayed on the display screen of the television set 110 connected to the STA 104 (FIG. 4).

On the display screen of the television set 110, if a user issues a command to form a group with the STA 103, setting of the group between the STA 104 and the STA 103 is performed. Note that when the forming of the group is specified by the user, the user also specifies whether the STA 103 should operate in the AP mode or the STA mode. In the following description, by way of example, it is assumed that the user has specified that the STA 103 should operate in the STA mode.

The STA 104 transmits a request for setting a group with the STA 103 to the AP 100 (M702). If the AP 100 receives the group setting request, the AP 100 transfers the received request to the STA 103 (M703). In this case, the group setting information (E507 in FIG. 5) in the group setting request includes operation mode information specifying "STA".

If the STA 103 receives the group setting request, the STA 103 returns a group setting response to the AP 100 (M704). The AP 100 transfers the received group setting response to the STA 104 (M705).

In this case, because the operation mode information included in the group setting information of the group setting request specifies "STA", the STA 103 operates in the STA mode. When the STA 104 receives the group setting response, the STA 104 operates in the AP mode.

The STA 103 and the STA 104 perform the group association process in accordance with the group setting information (E507 and E515) and the channel information (E508 and E516) included in the group setting information and the group setting response (M706). After completion of the group association process, stream data transmission between the STA 103 and the STA 104 is started (M707). Herein, the group association process refers to a process performed by the STA which is to operate in the STA mode associates with the STA which is to operate in the AP mode. In the following description, the term "group association" is used in a similar manner.

In the case where the user has specified that the STA 103 should operate in the AP mode, the operation mode information included in the group information (E507) of the group setting request is set to "AP". In this case, the STA 103 operates in the AP mode, and the STA 104 operates in the STA mode. As described above, the user is allowed to specify the operation mode as required.

Figure 8:
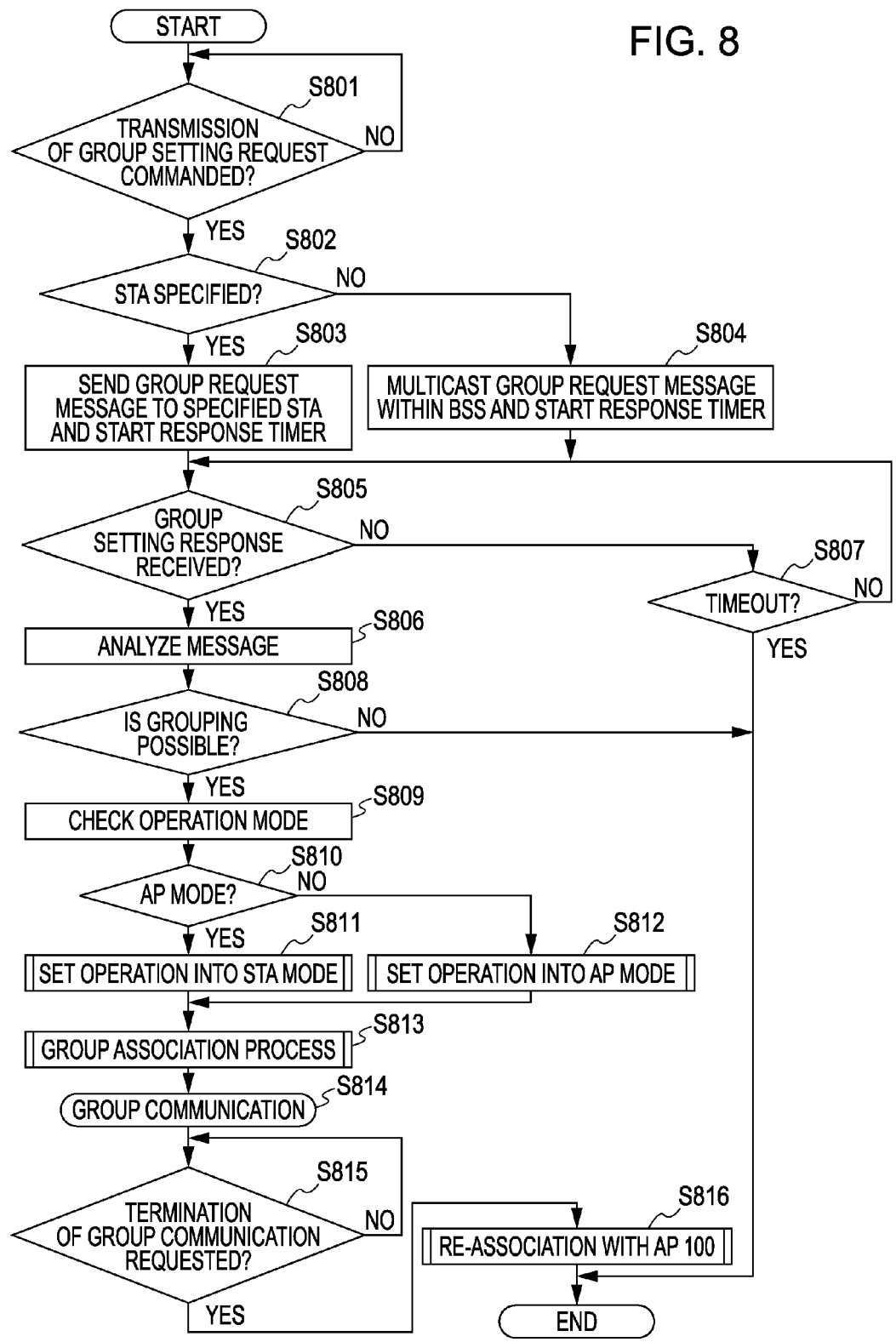
FIG. 8 illustrates an operation sequence performed by a wireless communication station to set a group according to an exemplary embodiment of the present invention.

FIG. 8 illustrates an operation sequence performed by the STA 104 to perform group setting.

If a user issues a group setting command (that is, if the answer to step S801 is Yes), it is determined whether a STA with which to form a group is specified. If so (Yes in step S802), the STA 104 transmits a group setting request to the specified STA. The STA 104 then starts a response timer (step S803).

In a case where no STA is specified (that is, if the answer to step S802 is No), the STA 104 multicasts a group setting request message to STAs within the network on which the STA 104 is located, and the STA 104 starts the response timer (step S804). The "multicast" refers to transmission of the same data to a plurality of STAs.

The group setting request message includes the group setting information (E507) indicating ESSID used in the group and the operation mode used by target STAs in the group communication. The channel information (E508) specifying a channel to be used in the group communication is also included in the group setting request message. At least one of the ESSID and the communication channel used in the group communication is set to be different from the ESSID or the channel used in the communication with the AP 100.

As described above, when a group is formed, parameters (ESSID, communication channel, etc.) are set to be different from those used in the existing network.

This makes it possible to form a network independent of the existing network and allocate a sufficient communication band, even when a communication band is entirely used in the existing network and there is no room in the communication band.

In a case where the STA 104 receives a group setting response message within the predetermined period set in the response timer (that is, if the answer to step S805 is Yes), the STA 104 checks the status code (E512 in FIG. 5) described in the message (step S806). If the status code indicates that it is possible to form a group (that is, if the answer to step S808 is Yes), then the STA 104 further checks the operation mode specified in the group setting information (step S809).

If the "AP" is specified as the operation mode (that is, if the answer to step S810 is Yes), that is, if it is specified that the STA which has sent the group setting response should operate in the AP mode, the STA 104 switches into the STA mode (step S811). When the "STA" is specified as the operation mode (that is, if the answer to step S810 is No), that is, if it is specified that the STA which has sent the group setting response should operate in the STA mode, the STA 104 switches into the AP mode (step S812).

The STA 104 then performs the group association process in accordance with the ESSID included in the group setting information (E515) and the channel information (E516) described in the group setting response message (step S813).

In the group association process, the STA 104 saves data indicating the communication parameters such as the ESSID and the channel used in the communication with the AP 100 into the storage unit (208 in FIG. 2).

After completion of the association process, the STA 104 performs communication in the formed group (step S814). In a case where the association is not successful, the STA 104 may re-associate with the AP 100 with which the STA 104 was in association. When the re-association with the AP 100 is performed, the STA 104 uses the communication parameters saved in the storage unit (208 in FIG. 2).

In a case where the group communication is terminated (if the answer to step S815 is Yes), the STA 104 re-associates with the AP 100 (step S816). The group communication is terminated not only when the STA 104 decides to terminate the group communication but also when a group communication termination message is received from an STA in the group.

In a case where the timeout set in the response timer expires before the group setting response message is received (that is, if the answer to step S805 is No and the answer to step S807 is Yes), the STA 104 determines that group setting is impossible and the STA 104 ends the process. When the group setting response message is received, if group setting is impossible (that is, if the answer to step S808 is No), the process is also ended.

Figure 9:
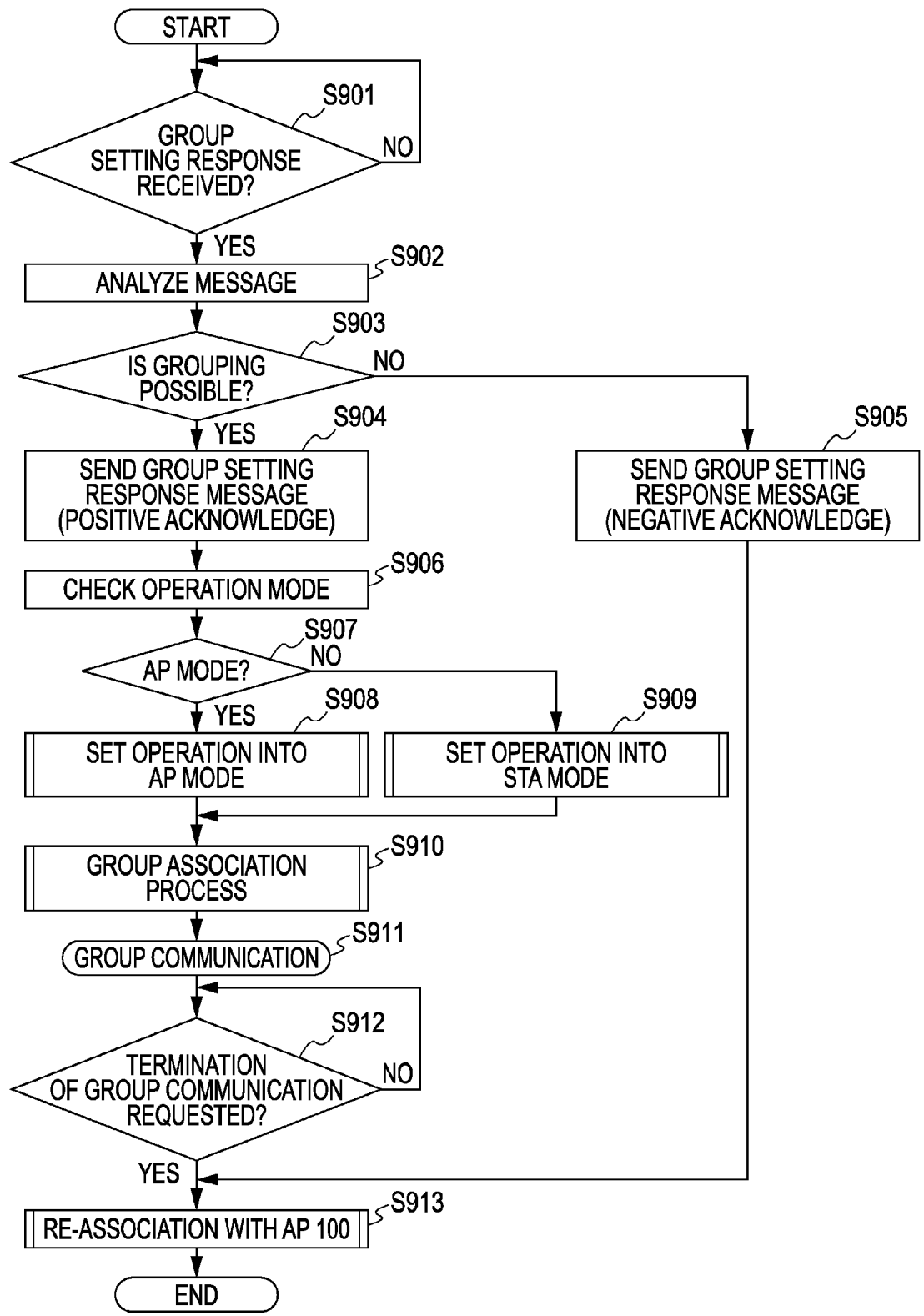
FIG. 9 illustrates an operation sequence performed by a wireless communication station in response to receiving a group setting request according to an exemplary embodiment of the present invention.

FIG. 9 illustrates an operation sequence performed by the STA 103 in response to receiving the group setting request.

If the STA 103 receives the group setting request (that is, if the answer to step S901 is Yes), the STA 103 analyzes the group setting information (E507) and the channel information (E508) (step S902).

If it is determined that group setting is possible (that is, if the answer to step S903 is Yes), the STA 103 sets the status code (E510) in the group setting response to indicate that group setting is possible, and the STA 103 returns the group setting response (step S904).

The STA 103 then analyzes the operation mode information included in the group setting information (E507) of the group setting request (step S906). If "AP" is specified as the operation mode (that is, if the answer to step S907 is Yes), the STA 103 operates in the AP mode (step S908). In a case where "STA" is specified as the operation mode (that is, if the answer to step S907 is No), the STA 103 operates in the STA mode (step S909).

The STA 103 performs the group association process in accordance with the ESSID described in the group setting information (E507) and the channel information (E508) included in the group setting request message (step S910). In the group association process, the STA 103 saves data indicating the communication parameters such as the ESSID and the channel used in the communication with the AP 100 into the storage unit (208 in FIG. 2).

After completion of the association process, the STA 103 performs communication in the formed group (step S911). In a case where the association is not successful, the STA 103 may re-associate with the AP 100 with which the STA 103 was in association. When the re-association with the AP 100 is performed, the STA 103 uses the communication parameters saved in the storage unit (208 in FIG. 2).

In a case where the group communication is terminated (if the answer to step S912 is Yes), the STA 103 re-associates with the AP 100 (step S913). The group communication is terminated not only when the STA 103 decides to terminate the group communication but also when a group communication termination message is received from an STA in the group.

If it is determined in step S903 that group setting is impossible (that is, if the answer to step S903 is No), the STA 103 sets the status code E510 in the group setting response to indicate that group setting is impossible, and the STA 103 returns the group setting response (step S905).

As described above, the present embodiment of the invention makes it possible to form a network independent of an existing network, in accordance with a command issued by a user. When communication using the formed network is ended, STAs are allowed to be re-connected to the original network. Thus, the network independent of the existing network can be formed only when it is required. When the entire communication band is in use and there is no room in communication band for further communication via the existing network, the network independent of the existing network may be formed for high-quality stream data transmission.

To form the network independent of the existing network, no complicated process such as re-starting of STAs is necessary. The network can be formed even in the middle of communication.

In a second exemplary embodiment of the present invention, after an STA sends a group setting request, this STA operates in a group communication mode regardless of whether a group setting response is received. In the present embodiment, an image displayed on the display screen of the television set 110 is similar to that illustrated in FIG. 4, a frame structure is similar to that illustrated in FIG. 5, and a system configuration is similar to that illustrated in FIG. 6.

Figure 20:
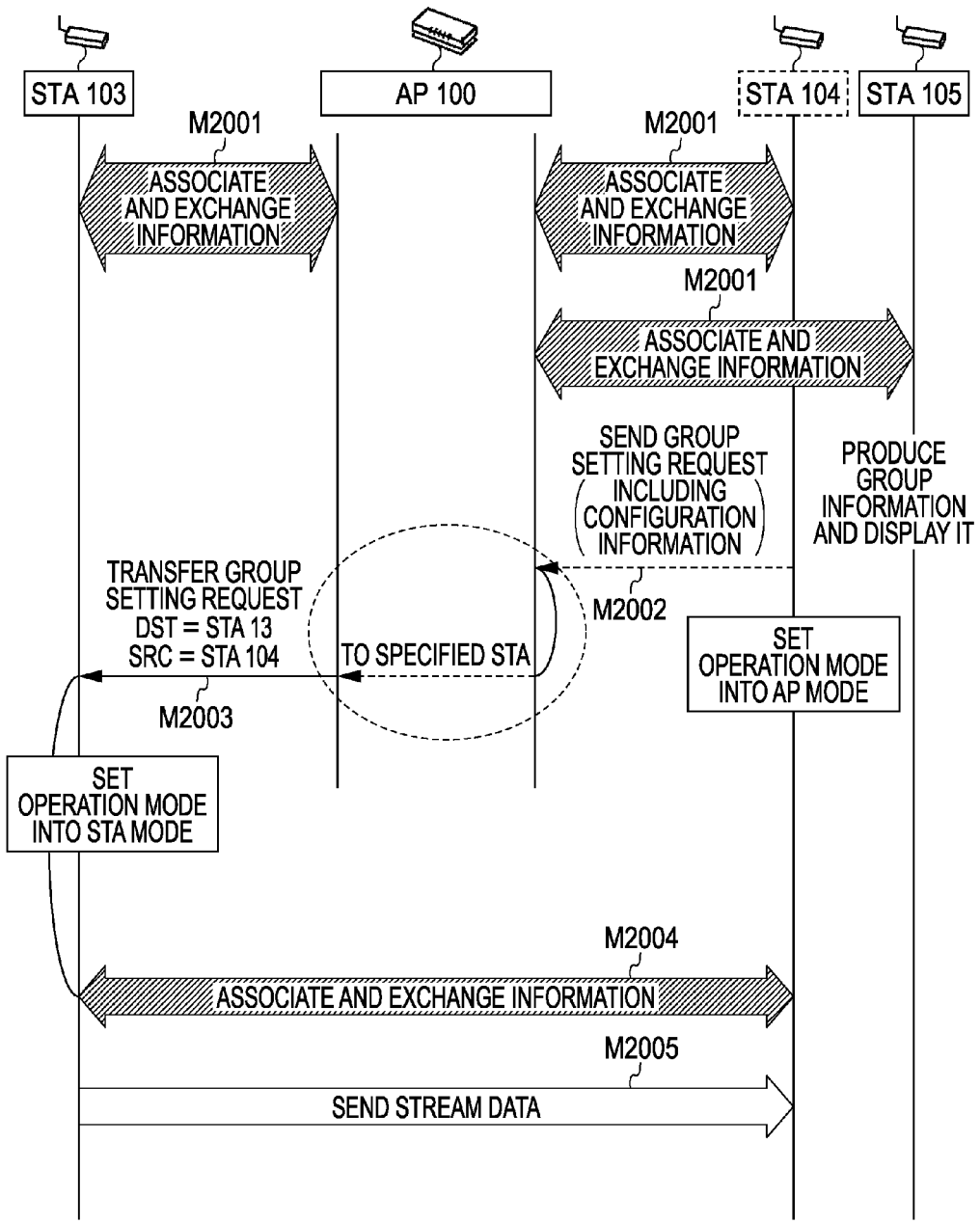
FIG. 20 illustrates an operation sequence according to an exemplary embodiment of the present invention.

FIG. 20 illustrates an operation sequence according to the present embodiment of the invention.

First, the association process is performed between the AP 100 and the STA 103, 104, or 105. In the association process, information associated with the capabilities such as the capability of forming a grope is exchanged between STAs (M2001). The capabilities of the respective STAs indicated in the exchanged information are displayed on the display screen of the television set 110 connected to the STA 104 (FIG. 4).

On the display screen of the television set 110, if a user issues a command to form a group with the STA 103, setting of the group between the STA 104 and the STA 103 is performed. In the following description, by way of example, it is assumed that the user has specified that the STA 103 should operate in the STA mode. The STA 104 transmits a request for setting a group with the STA 103 to the STA 103 via the AP 100 (M2002 and M2003). In this case, operation mode information in the group setting request is described to specify "STA".

The STA 104 operates in the AP mode. If the STA 103 receives the group setting request, the STA 103 operates in the STA mode specified by the operation mode information included in the received group setting request.

The STA 103 then associates with the STA 104 (M2004) and transmits stream data to the STA 104 according to the ESSID and the channel specified in the group setting request (M2005).

Figure 21:
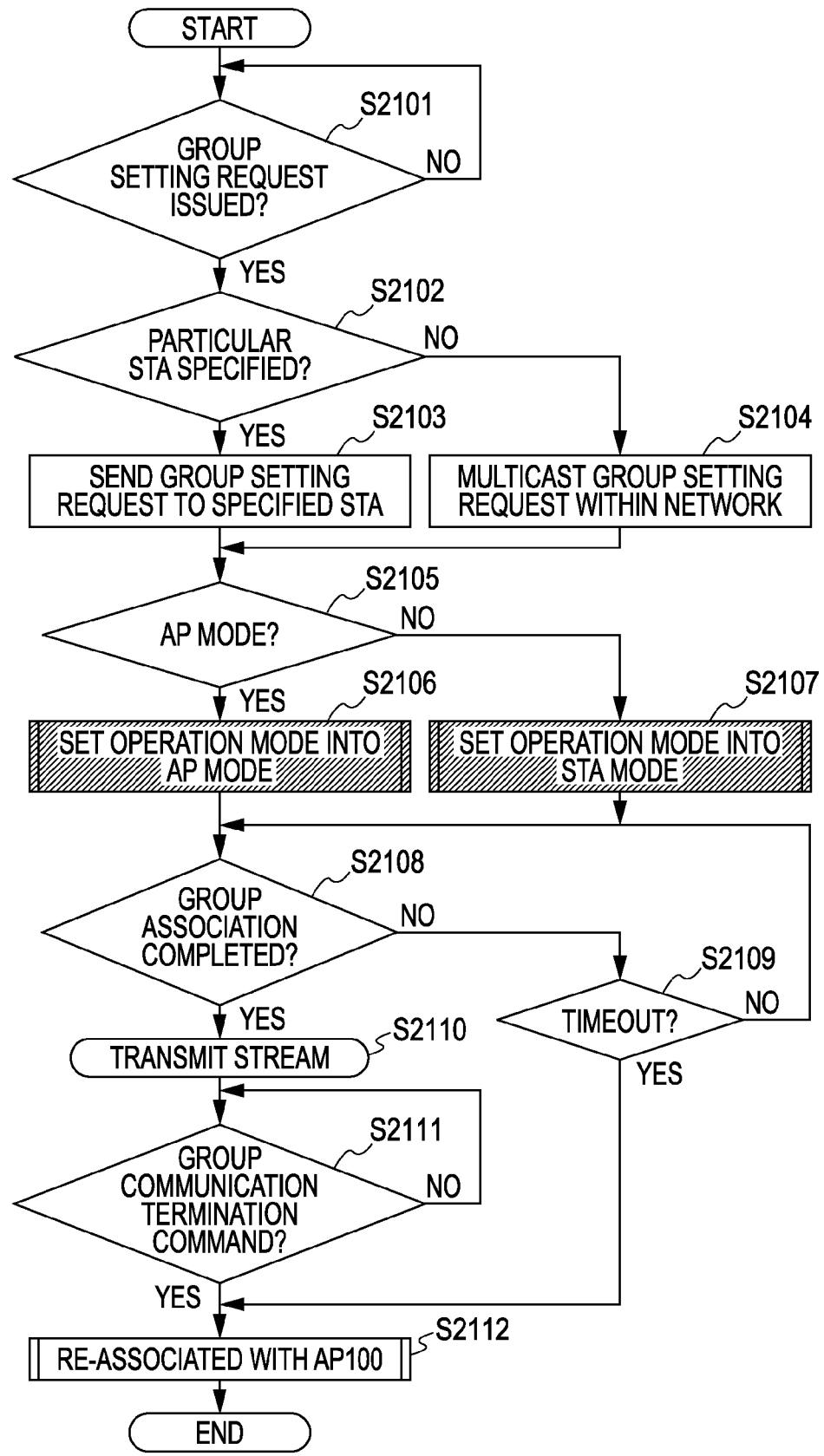
FIG. 21 illustrates an operation sequence performed by a wireless communication station to set a group according to an exemplary embodiment of the present invention.

FIG. 21 illustrates an operation sequence performed by the STA 104 to perform group setting.

If a user issues a group setting command (that is, if the answer to step S2101 is Yes), it is determined whether a STA with which to form a group is specified. If so (Yes in step S2102), the STA 104 transmits a group setting request to the specified STA. (step S2103).

In a case where no STA is specified (that is, if the answer to step S2102 is No), the STA 104 multicasts a group setting request message to STAs within the network on which the STA 104 is located (step S2104).

In this case, the STA 104 operates in either the AP mode or the STA mode (steps S2105, S2106, and S2107).

The STA 104 then performs the group association process in the mode in which the STA 104 operates. In a case where the association is completed within a predetermined period (that is, if the answer to step S2108 is Yes), the STA 104 starts transmission of stream data in the formed group (step S2110). In the group association process, the STA 104 saves data indicating the communication parameters such as the ESSID and the channel used in the communication with the AP 100 into the storage unit (208 in FIG. 2).

If the association process is not completed within the predetermined period (that is, if the answer to step S2108 is No and the answer to step S2109 is Yes), the STA 104 re-associates with the AP 100 (step S2112). When the re-association with the AP 100 is performed, the STA 104 uses the communication parameters saved in the storage unit (208 in FIG. 2).

When the group communication is terminated after the start of transmission of stream data (that is, if the answer to step S2111 is Yes), the STA 104 re-associates with the AP 100 (step S2112).

The present embodiment of the invention provides not only advantages similar to those obtained in the first embodiment described above, but also an advantage that forming of a network independent of an existing network is tried without waiting for a response from a specified STA so as to immediately form the network independent of the existing network. When forming of the network independent of the existing network fails, the STA is allowed to be re-connected to the existing network.

In a third exemplary embodiment, disclosed is a process of setting a group according to information associated with input/output devices connected to respective STAs.

FIG. 10 illustrates an information management table representing capabilities of respective STAs within a network. Note that the information management table is stored in the storage unit (208 in FIG. 2 or 3) of each STA.

In the information management table, ID (identification information) of each STA (STAs 101 to 106) is described in a column E1001. In a column E1002, a MAC address of each STA is described. In a column E1003, a maximum communication rate allowed in wireless communication of each STA is described. In a column E1004, information is described to indicate whether each STA has the group setting capability. In a column E1005, information is described to indicate whether each STA is connected to an input device (I) or an output device (O), that is, indicate the type of a device connected to each STA.

In the present embodiment, the input device refers to a device having the capability of transmitting stream data to an output device, and the output device refers to a device having the capability of receiving stream data transmitted from an input device and displaying the stream data in a form that can be viewed by users.

In the information management table, a name of a device connected to each STA is described in a column E1006. In a column E1007, information indicating the type of an interface serving to interface each STA with an input/output device connected to the STA is described. In a column E1008, a transfer mode of communication between each STA and an input/output device connected to the STA is described.

Figure 11:
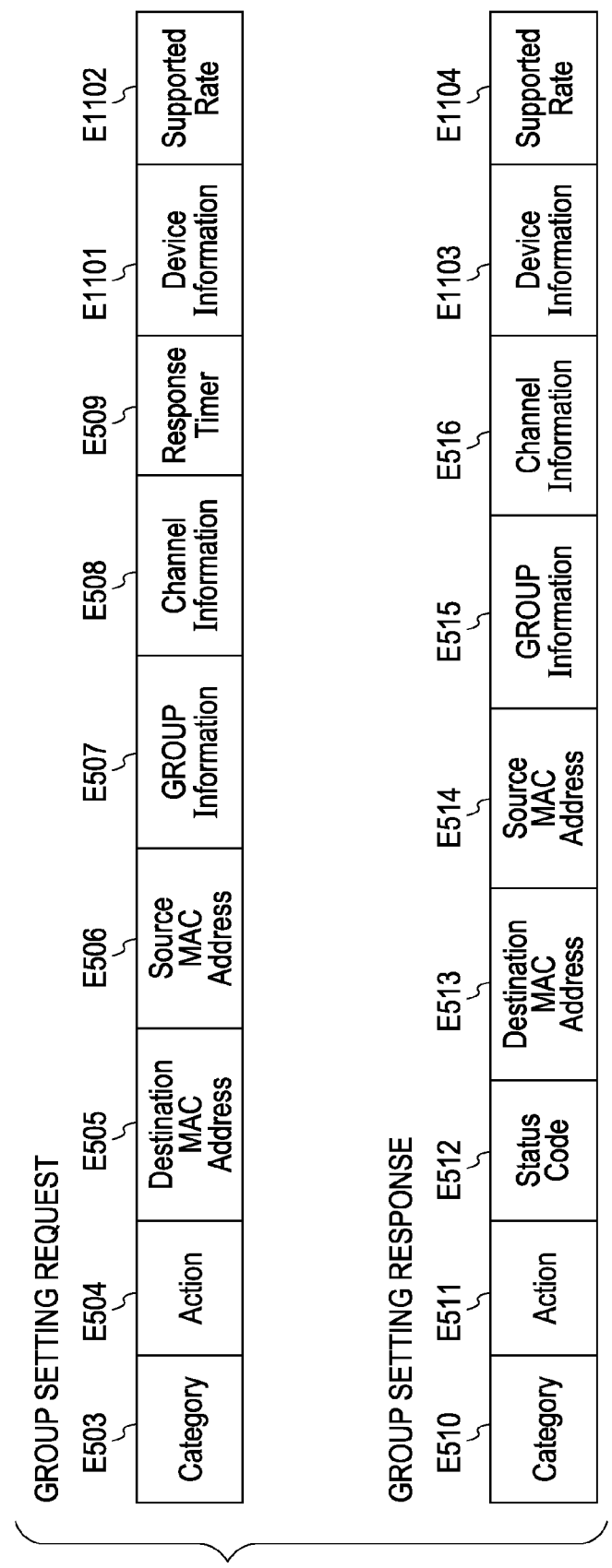
FIG. 11 illustrates a message format according to an exemplary embodiment of the present invention.

FIG. 11 illustrates a format of a group setting request message and a format of a group setting response message according to the present embodiment. The group setting request message includes fields E503 to E509 similar to those in (c) of FIG. 5 and additional fields E1101 and E1102. The group setting response message includes fields E510 to E516 similar to those in (d) of FIG. 5 and additional fields E1103 and E1104. The group communication termination message is similar to (e) of FIG. 5, and thus a duplicated description thereof is omitted herein.

In fields E1101 and E1103, device information associated with a device connected to the STA is described. More specifically, the device information includes information indicating a device type (input device or output device), a device name, an interface type, a transfer mode, etc.

In fields E1102 and E1104, information indicating a communication rate supported in stream data transmission is described. For example, a maximum communication rate, a minimum communication rate, and an average communication rate are described.

Figure 12:
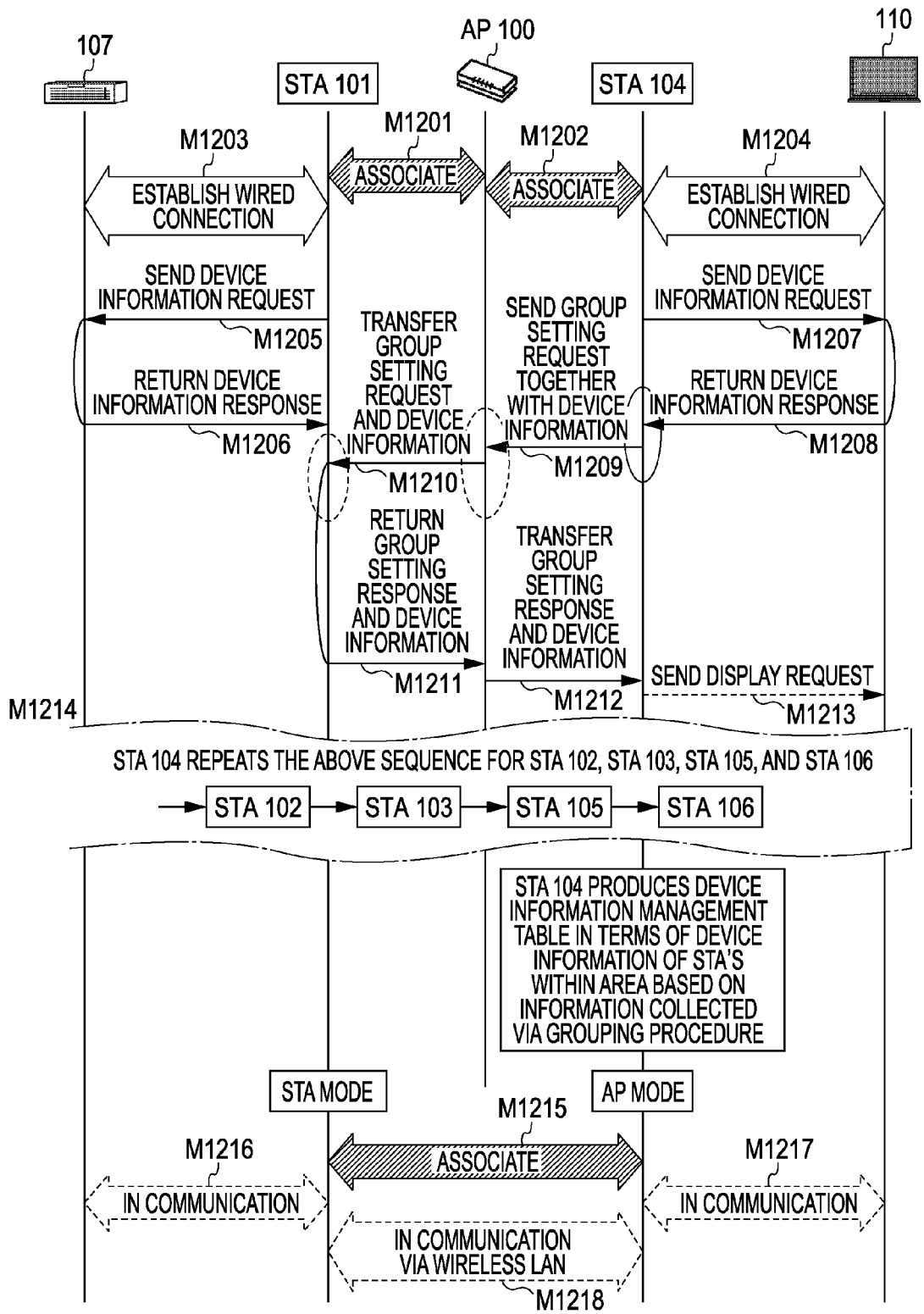
FIG. 12 illustrates a sequence of operation steps of collecting device information according to an exemplary embodiment of the present invention.

FIG. 12 illustrates an operation sequence performed by the STA 104 to collect information associated with input/output devices 107 to 111 connected to the respective STAs in the network. In this figure, in particular, the operation including steps of transmitting/receiving group setting messages between the STA 101 and the AP 100 and between the AP 100 and the STA 104.

First, the STA 101 and the STA 104 associate with the AP 100 (M1201 and M1202). The STA 101 then establishes a wired connection to the tuner 107 (M1203), and the STA 104 establishes a wired connection to the television set 110 (M1204). Note that the association processes M1201 and M1202 and the wired connection establishing processes M1203 and M1204 may be performed in an arbitrary order.

Thereafter, the STA 101 requests the tuner 107 connected to the STA 101 to provide device information (M1205). In response, the tuner 107 returns device information associated with the tuner 107 to the STA 101 (M1206).

The STA 104 requests the television set 110 connected to the STA 104 to provide device information (M1207). In response, the television set 110 returns device information associated with the television set 110 to the STA 104 (M1208).

The STA 104 stores the received device information associated with the television set 110 in the information management table (FIG. 10). The STA 104 recognizes, from the received device information, that the television set 110 is an output device. The STA 104 then tries to collect device information associated with devices connected to the respective STAs within the network.

To this end, first, the STA 104 sends a group setting request to the STA 101 via the AP 100 (M1209 and M1210). In this sequence, of a plurality of STAs, an STA connected to an output device switches into the AP mode to form a group. The other STAs are expected to operate in the STA mode. To request the other STAs to operate in the STA mode, "STA" is specified in the operation mode information in the group setting information (E507 in FIG. 11) of the group setting request sent from the STA 104.

The STA 101 describes the device information associated with the tuner 107 in the field E1103 of the device setting response message (FIG. 11). In this specific example, the STA 101 has already acquired the device information associated with the tuner 107 via the process (M1205 and M1206) performed after the wired connection establishing process (M1203). However, in a case where the group setting request is received from the STA 104 (M1209 and M1210) before the device information is acquired, the STA 101 acquires the device information from the tuner 107 in response to receiving the group setting request.

The STA 101 then describes further information such as that indicating whether the STA 101 has the group communication capability in the device setting response message and returns the device setting response message to the STA 104 via the AP 100 (M1211 and M1212).

The STA 104 updates the information management table in accordance with the information described in the received device setting response message. The STA 104 then sends a display request message together with information described in the update information management table to the television set 110 (M1213).

By performing a similar process, the STA 104 collects device information from other STAs, updates the information management table, and sends the display request message to the television set 110 (M1214). Instead of sending the display request message each time device information is acquired, the STA 104 may send the display request message to the television set 110 after device information has been collected from all STAs in the network.

Thereafter, the STA 104 associates with an STA having the group communication capability (M1215). In this case, the STA 104 operates in the AP mode, and the STA which returned the response indicating that the STA has the group communication capability operates in the STA mode.

Thus, communication via a wireless LAN is started between the tuner 107 serving as an input device and the television set 110 (M1216, M1217, and M1218).

Although in the present example, an STA connected to an output device switches into the AP mode and requests other STAs to operate in the STA mode, a determination as to which STA should operate in the AP mode may be made in a different manner. For example, an STA to which a group setting request is first send may be specified to operate in the AP mode. In this case, if the specified STA has the group forming capability, this STA switches into the AP mode and the other STAs are requested to operate in the STA mode.

If the specified STA does not have the group forming capability, an STA to which the group setting request is sent next is requested to operate in the AP mode. Until an STA which should operate in the AP mode is finally determined, "AP" is specified in the operation mode information included in the group setting request transmitted to any STA. After the STA which should operate in the AP mode is finally determined, "STA" is specified in the operation mode information included in the group setting request transmitted to any remaining STA. If it is possible to adequately determine an STA which should operate in the AP mode and set the other STAs to operate in the STA mode as described above, then it is possible to adequately form a group.

Figure 13:
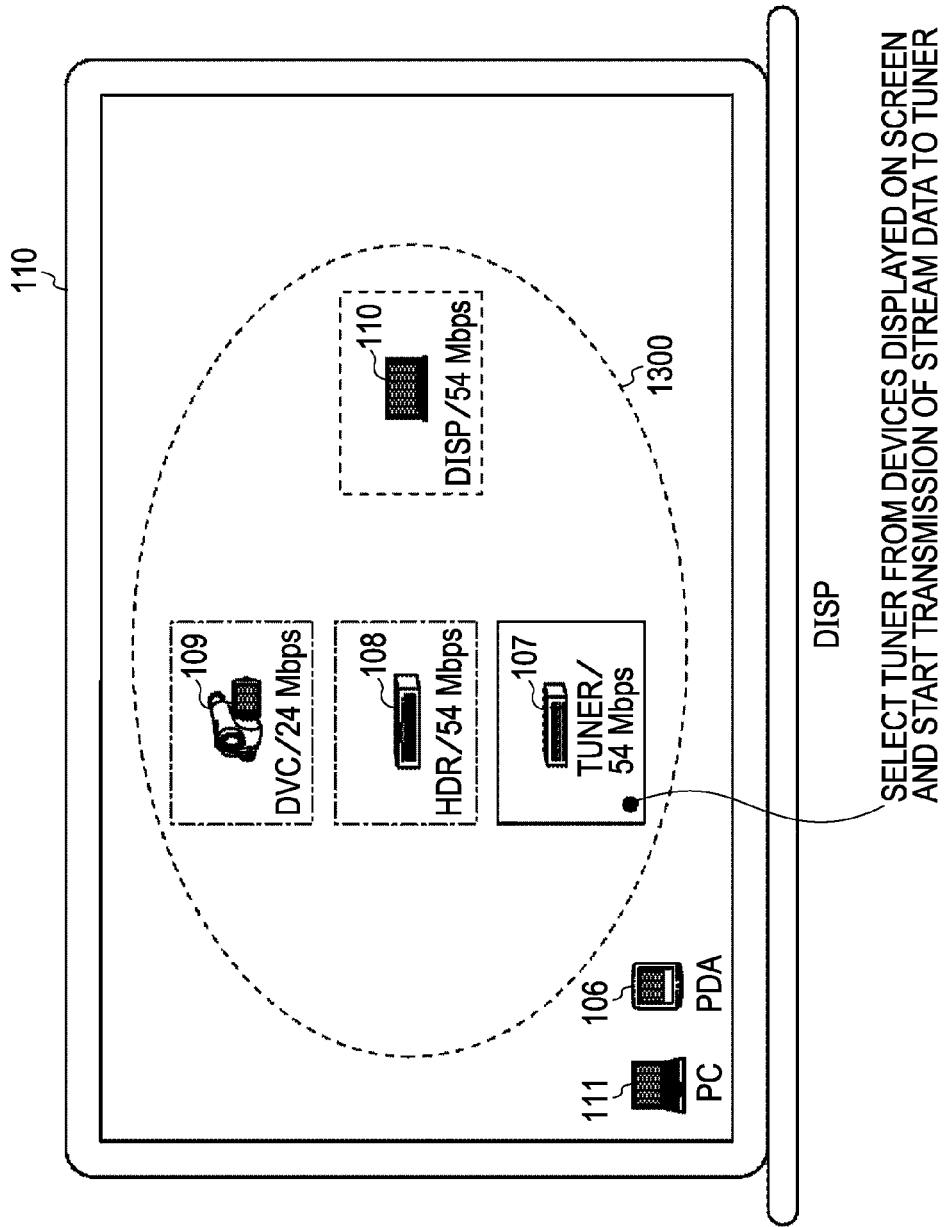
FIG. 13 is a diagram illustrating an example of an image displayed on a display screen of a television set according to an exemplary embodiment of the present invention.

FIG. 13 illustrates an example of an image which is displayed on the display screen of the television set 110 according to the display request message received from the STA 104. In this example, it is assumed that the image is displayed in a state in which device information has already been collected by the STA 104 from all STAs in the network. As illustrated in FIG. 13, devices 107 to 110 connected to respective STAs and an STA (PDA) 106 are displayed in the form of icons. Information about the respective devices is displayed in accordance with the information management table included in the display request message received from the STA 104.

Devices enclosed in a dashed circle 1300 are those connected to STAs having the capability of transmitting stream data in group communication. It is possible to form a group between the television set 110 serving as an output device and an input device selected from the tuner 107, the HDR 108, and the DVC 109.

A maximum supported communication rate of each STA is also displayed. Taking into account the communication rate, a user selects an STA with which to form a group.

Figure 14:
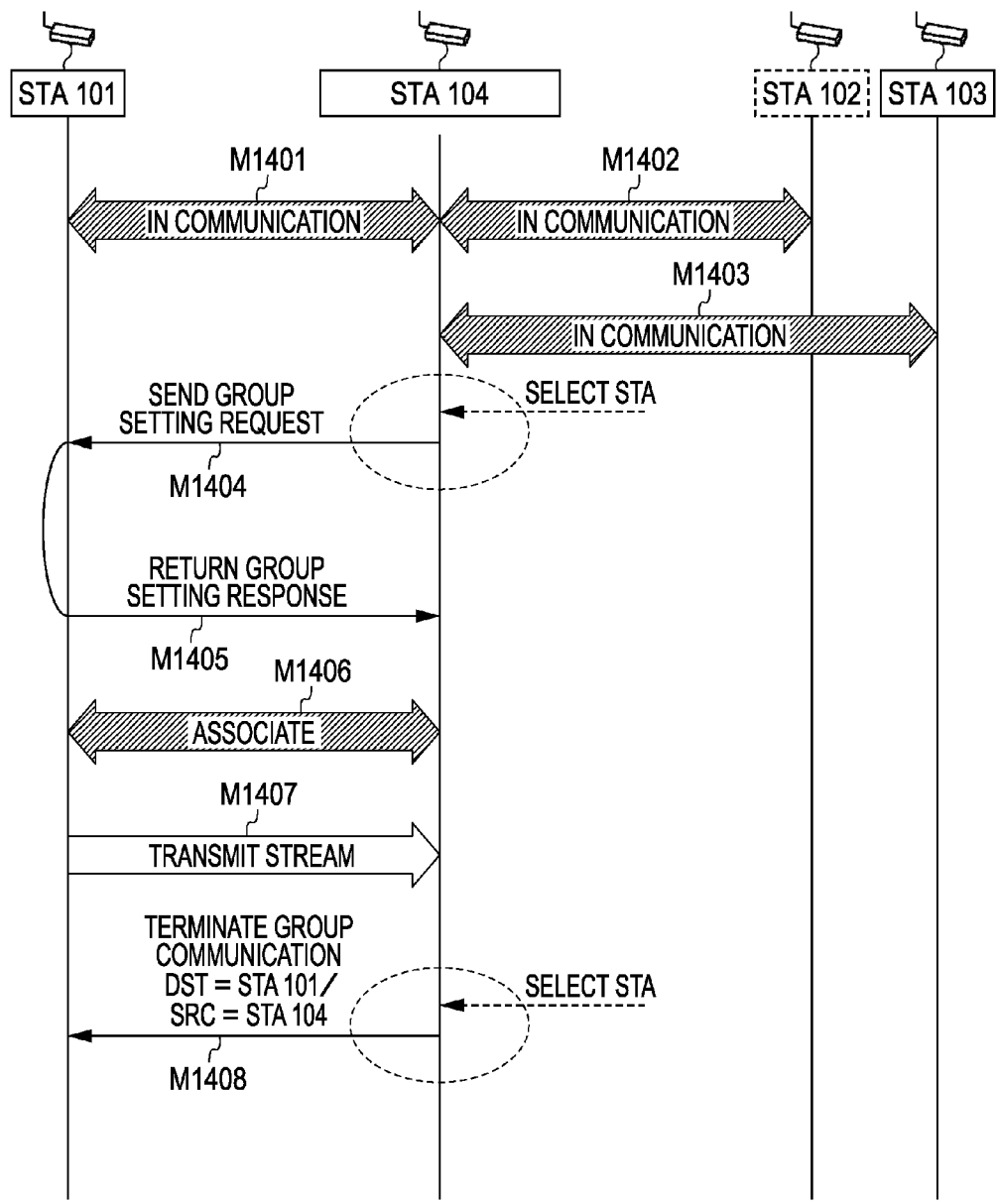
FIG. 14 illustrates a sequence of operation steps performed after a group has been formed, according to an exemplary embodiment of the present invention.

FIG. 14 illustrates an operation sequence performed by STAs after a group is formed according to the sequence illustrated in FIG. 12.

In the following explanation, by way of example, it is assumed that a group is formed in order to transmit stream data between the STA 104 and the STA 101.

When communication is being performed between the STA 104 operating in the AP mode and STAs 101 to 103 operating in the STA mode (M1401, M1402, and M1403), if a user selects the tuner 107 on the display screen of the television set 110 and issues a command to start transmission of stream data, then the STA 104 sends a group setting request to the STA 101 to which the tuner 107 is connected (M1404). In this case, "NOT SPECIFIED" is described in the operation mode information of the group setting information (E507 in FIG. 11) of the group setting request sent from the STA 104. Furthermore, an ESSID used in the communication between the STA 101 and the STA 104 is described in the group setting information (E507). Note that the ESSID has a value different from that used in previous group communication. This makes it possible for the STA 101 and the STA 104 to form a new network (group) independent of the previously formed network (group) without having to switch their operation modes.

If the STA 101 receives the group setting request, the STA 101 returns a group setting response to the STA 104 (M1405). In this group setting response returned by the STA 101, information indicating that the STA 101 has the group communication capability is described in the status code (E512).

In accordance with the ESSID described in the group setting information (E507), the STA 101 newly associates with the STA 104 (M1406). After completion of the association process, stream data transmission from the STA 101 to the STA 104 is started (M1407).

If a user selects the tuner 107 on the display screen of the television set 110 and issues a command to terminate transmission of stream data, the STA 104 transmits a group communication termination message to the STA 101 (M1408). In this group communication termination message, information indicating that the termination is a normal terminal is described in the reason information (E521).

If the STA 101 receives the group communication termination message, the STA 101 stops the transmission of stream data to the STA 104.

Figure 15:
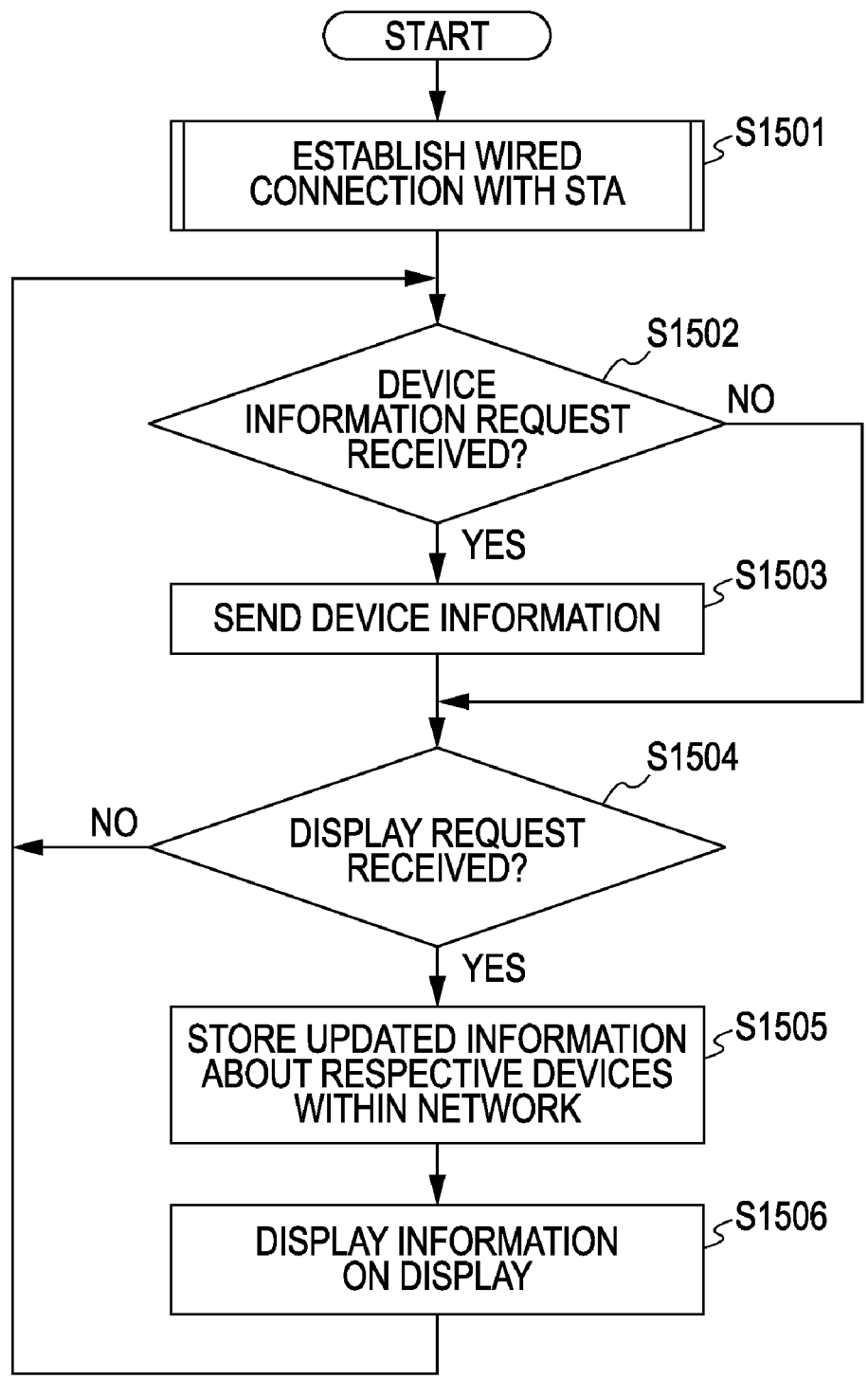
FIG. 15 is a flow chart illustrating an operation of a television set according to an exemplary embodiment of the present invention.

FIG. 15 is a flow chart illustrating an operation of the television set 110.

First, the television set 110 establishes a wired connection with the STA 104 (step S1501). If the television set 110 receives a device information request from the STA 104 (that is, if the answer to step S1502 is Yes), the television set 110 sends device information associated with the television set 110 to the STA 104 (step S1503).

In a case where the television set 110 receives a display request message from the STA 104 (that is, if the answer to step S1504 is Yes), the television set 110 extracts device information associated with the respective devices in the network from the information management table included in the message and stores the extracted device information (step S1505).

In accordance with the stored device information, the television set 110 displays the device information on the display screen as illustrated in FIG. 13.

Figure 16:
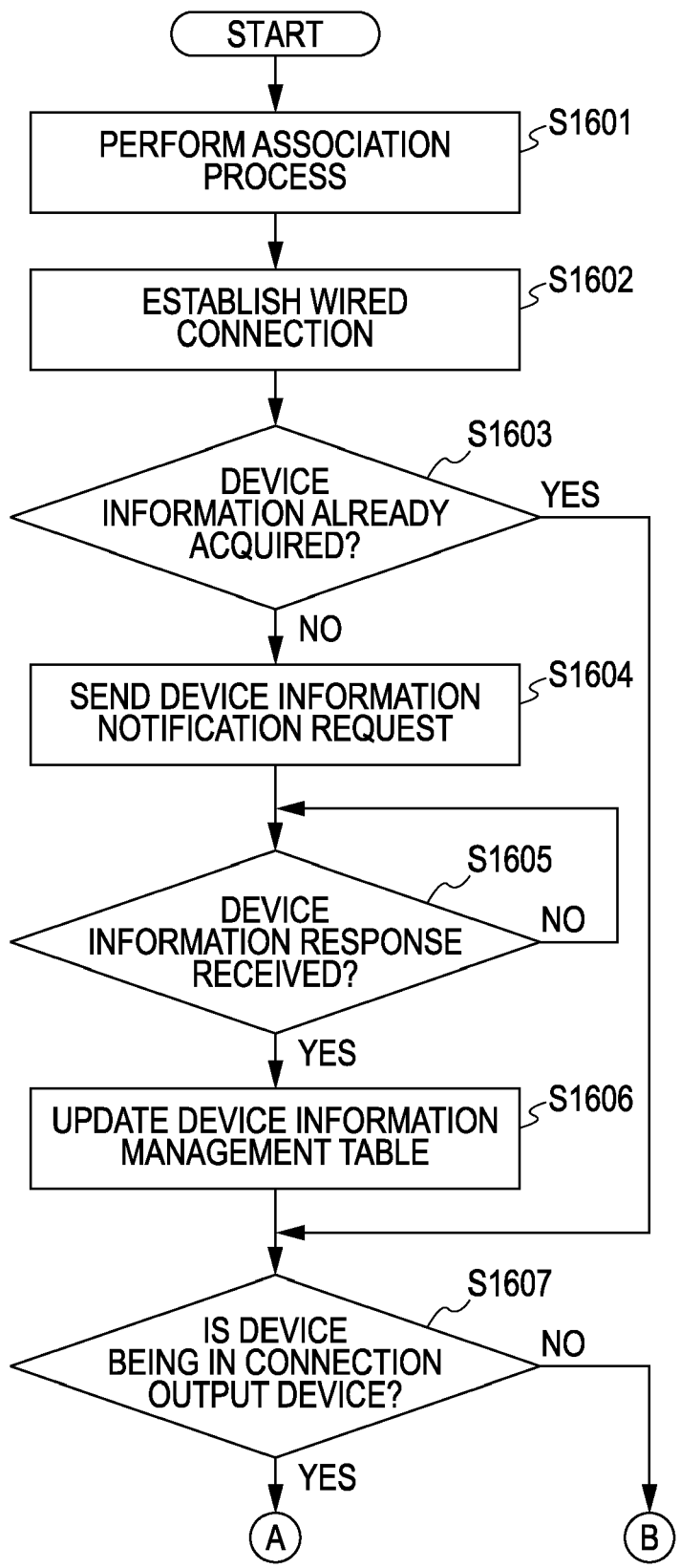
FIG. 16 is a flow chart illustrating an operation of a wireless communication station according to an exemplary embodiment of the present invention.

FIG. 16 is a flow chart illustrating an operation of each STA.

First, an STA associates with the AP 100 (step S1601), and establishes a wired connection with a device (step S1602).

If the STA has not yet acquired the device information associated with the wire-connected device (that is, if the answer to step S1603 is No), the STA requests the device to provide device information (step S1604).

If the device information is received from the device (that is, if the answer to step S1605 is Yes), the STA updates the conversion table (step S1606).

The STA identifies, from the received device information, whether the wire-connected device is an output device or an input device (step S1607). The following process is performed differently depending on whether the wire-connected device is an output device or an input device.

Figure 17:
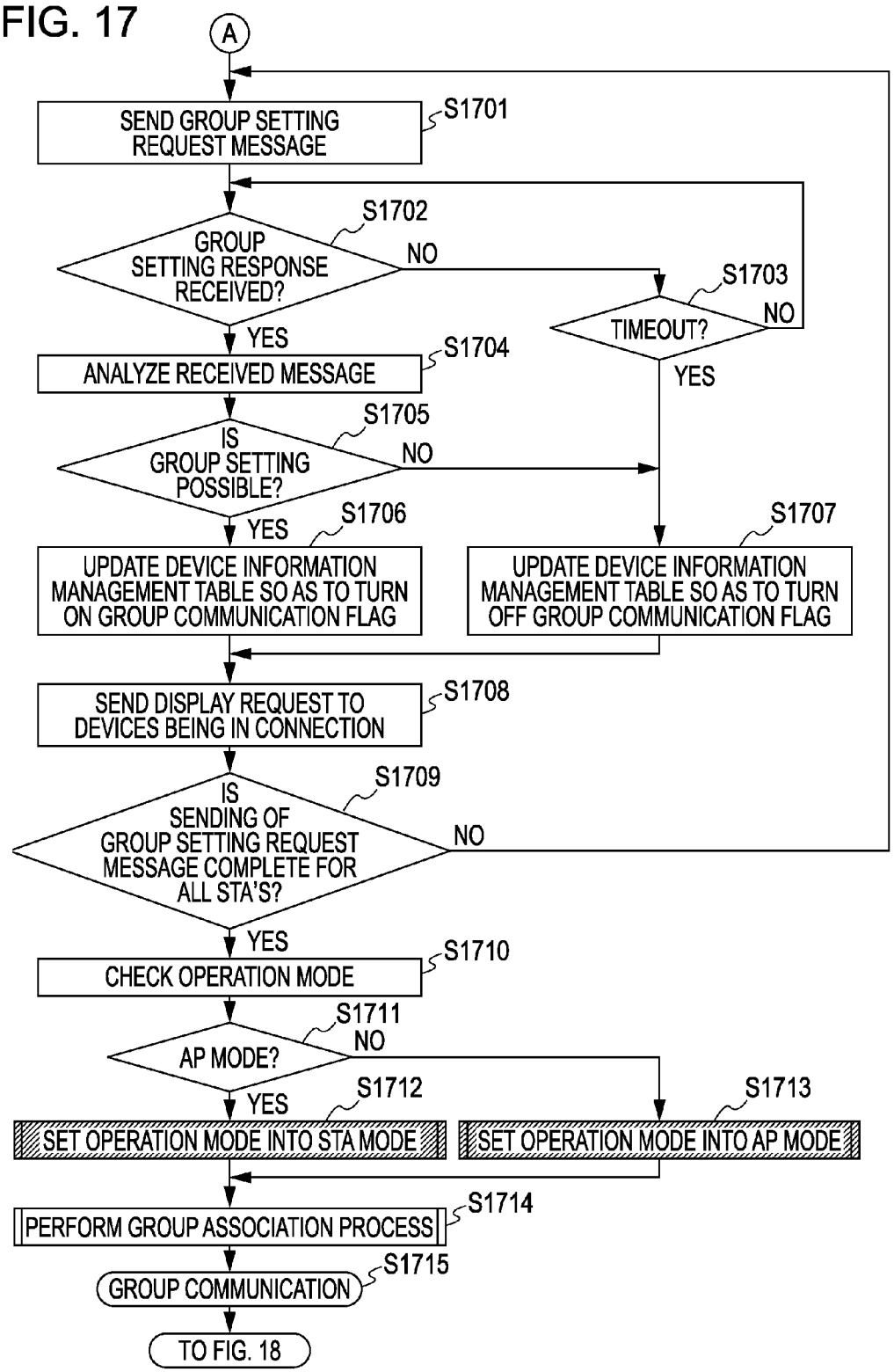
FIG. 17 is a part of a flow chart illustrating an operation performed by a wireless communication station when the wireless communication station is in connection with an output device, according to an exemplary embodiment of the present invention.
Figure 18:
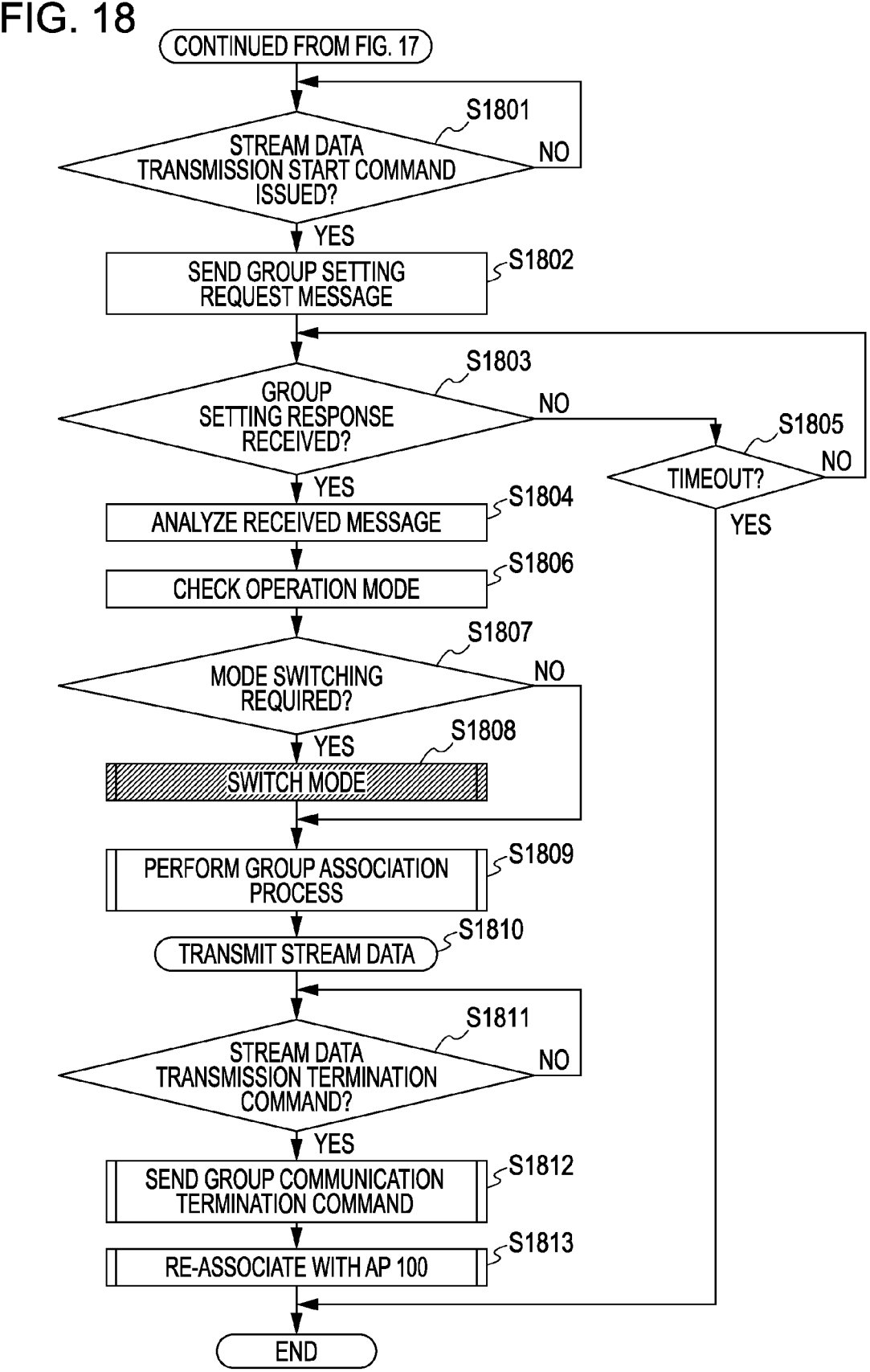
FIG. 18 is a flow chart illustrating a part following the flow chart illustrated in FIG. 17.

An example of an operation of the STA performed when the wire-connected device is an output device (that is, the answer to step S1607 is Yes) is described below with reference to a flow chart illustrated in FIG. 17. Note that when the STA itself can function as an output device, the STA operates in a similar manner.

First, to collect device information from other STAs in the network, the STA transmits a group setting request (step S1701).

If a group setting response is received (that is, if the answer to step S1702 is Yes), the STA checks the status code (E512 in FIG. 11) (step S1704).

If the status code indicates that group communication is possible (that is, if the answer to step S1705 is Yes), the STA sets, into an ON-state, the flag (E1004 in FIG. 10) of the group setting capability in the information management table. The STA further extracts the device information (E1103 in FIG. 11) and the supported maximum communication rate (E1104 in FIG. 11) from the group setting response message and describes them in the information management table (step S1706).

In a case where the status codes indicates that group communication is impossible (that is, if the answer to step S1705 is No), the STA sets, into an OFF-state, the flag (E1004 in FIG. 10) of the group setting capability in the information management table. Also in this case, the STA further extracts the device information (E1103 in FIG. 11) and the supported maximum communication rate (E1104 in FIG. 11) from the group setting response message and describes them in the information management table (step S1707).

Also in a case where the timeout occurs before the group setting response is received (that is, when the answer to step S1702 is No and the answer to step S1703 is Yes), the STA sets the flag (E1004 in FIG. 10) of the group setting capability into the OFF-state (step S1707). In this case, nothing is described in the other fields (E1003 and E1005 to E1008) of the information management table.

The STA sends a display request message including the updated information management table to the device connected to the STA (step S1708).

Steps S1701 to S1708 are performed repeatedly by the STA until the group setting request has been sent to all STAs in the network (step S1709).

If transmission of the group setting request is completed for all STAs (that is, if the answer to step S1709 is Yes), the STA starts forming a group with STAs which have returned a response indicating that group communication is possible.

When the group is newly formed, the STA saves data indicating the communication parameters such as the ESSID and the channel used in the previous group communication in the storage unit (208 in FIG. 2 or 3).

First, the STA analyzes the operation mode information included in the group setting response message (step S1710). If the operation mode information indicates the "AP" mode (that is, if the answer to step S1711 is Yes), the STA operates in the STA mode (step S1712). If the operation mode information indicates the "STA" mode (that is, if the answer to step S1711 is No), the STA operates in the AP mode (step S1713).

The STA performs the association process in the mode in which the STA operates (step S1714) and starts communication in the formed group (step S1715).

On the display screen of the television set 110, if a user issues a command to start stream data transmission from the input device (that is, if the answer to step S1801 is Yes), the STA sends a group setting request to an STA connected to the input device specified by the user (step S1802). In this group setting request, if the operation mode is not to be switched, "NOT SPECIFIED" is described in the operation mode information and an ESSID and a channel to be used in a new group are described in the above-described group setting request message. At least one of the ESSID and the communication channel used in the new group is set to be different from the ESSID or the channel used in the previous group.

If the STA receives a group setting response message (that is, if the answer to step S1803 is Yes), the STA analyzes the received message (step S1804). The STA determines the operation mode in which the STA should operate in the new group (step S1806). If it is necessary to change the operation mode (that is, if the answer to step S1807 is Yes), the STA switches the operation mode (step S1808).

The STA performs the association process in the new group (step S1809), and starts transmission of stream data (step S1810).

If a stream data transmission termination command is issued by a user (that is, if the answer to step S1811 is Yes), the STA sends a group communication terminal message (step S1812). The STA then re-associates with the previous group in which the STA was located before the current group was formed (step S1813).

When the STA re-associates with the previous group, the STA 103 uses the communication parameters saved in the storage unit (208 in FIG. 2 or 3).

Figure 19:
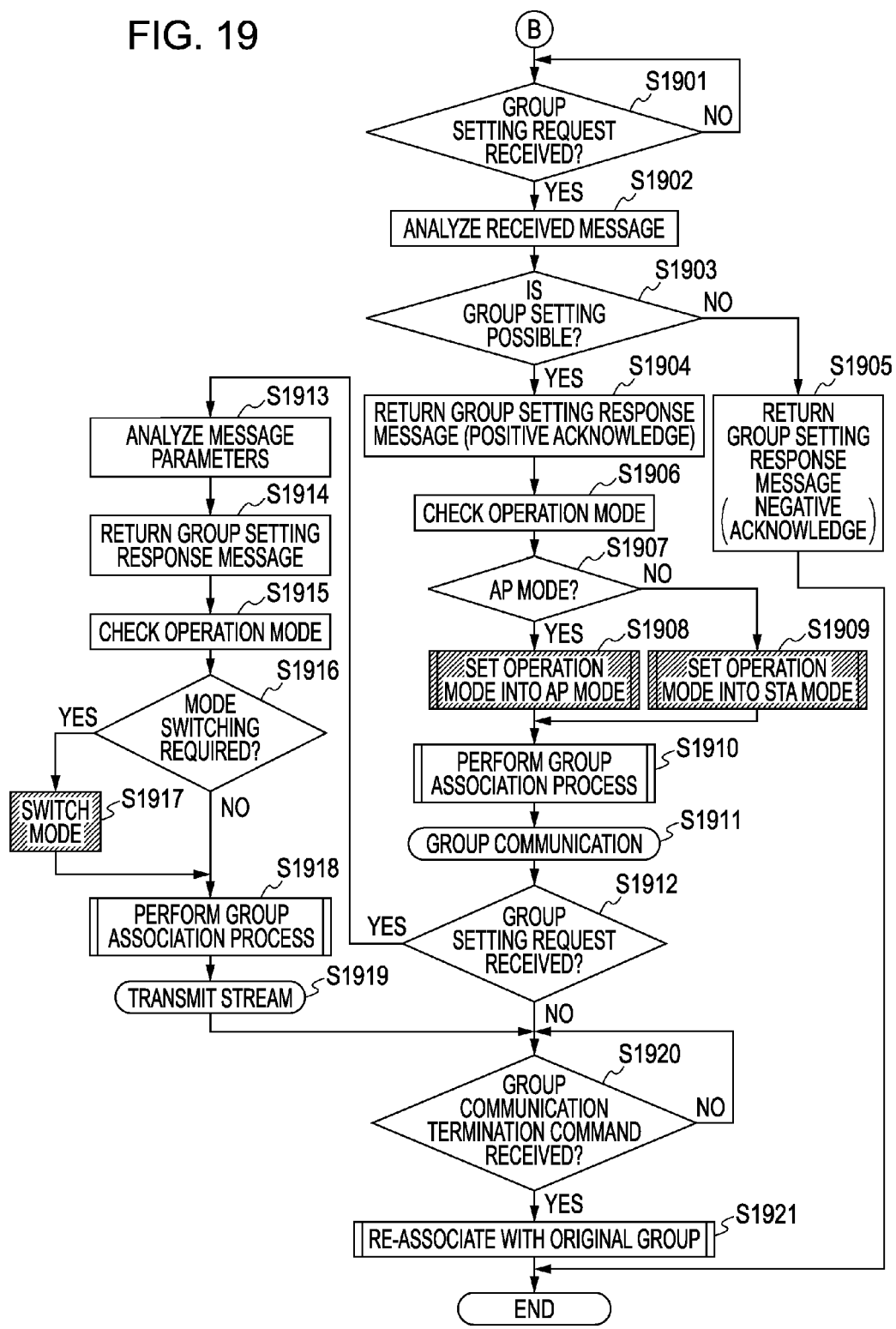
FIG. 19 is a flow chart illustrating an operation performed by a wireless communication station when the wireless communication station is in connection with an input device, according to an exemplary embodiment of the present invention.

Now, an example of an operation of the STA performed when the wire-connected device is an output device (that is, the answer to step S1607 in FIG. 16 is No) is described below with reference to a flow chart illustrated in FIG. 19. Note that when the STA itself can function as an input device, the STA operates in a similar manner.

If the STA receives a group setting request (that is, if the answer to step S1901 is Yes), the STA analyzes the group setting information (E507) and the channel information (E508) (step S1902).

If it is determined that group setting is possible (that is, if the answer to step S1903 is Yes), the STA sets the status code (E510) in the group setting response to indicate that group setting is possible, and the STA returns the group setting response (step S1904).

The STA then analyzes the operation mode information included in the group setting information (E507) of the group setting request (step S1906). If "AP" is specified as the operation mode (that is, if the answer to step S1907 is Yes), the STA operates in the AP mode (step S1908). In a case where "STA" is specified as the operation mode (that is, if the answer to step S1907 is No), the STA operates in the STA mode (S1909).

The STA performs the group association process in accordance with the ESSID described in the group setting information (E507) and the channel information (E508) included in the group setting request message (step S1910).

After completion of the association process, the STA performs communication in the formed group (S1911).

If the STA receives a group setting request (that is, if the answer to step S1912 is Yes), the STA analyzes the group setting information (E507) and the channel information (E508) (step S1913), and returns a group setting response (step S1914).

The STA analyzes the operation mode information (step S1915). If it is necessary to change the operation mode (that is, if the answer to step S1916 is Yes), the STA switches the operation mode (step S1917).

The STA performs the group association process in accordance with the newly specified ESSID and the channel (step S1918), and starts transmission of stream data (step S1919).

After the start of the stream data transmission, if the STA receives a group communication termination message (that is, if the answer to step S1920 is Yes), the STA re-associates with the previous group in which the STA was located before the current group was formed (step S1921).

In the present embodiment, as described above, the STA connected to the television set 110 collects device information from the other STAs within the network and displays the collected device information on the display screen of the television set 110. Alternatively, when the STA itself has a display, the device information may be displayed on the display of the STA itself.

In the present embodiment, as described above, an STA connected to an output device collects device information from each STA in the network by using a group setting message, and the STA sends the collected device information to the output device. Thus, users can easily recognize status of the network, the capabilities of the respective STAs, and device information associated with the devices connected to the respective STAs. This is very convenient for users.

After the independent network is formed, if it is desired to perform one-to-one communication in another network because the present network has no room in communication band for further communication, it is allowed to form a new independent network. That is, it is possible to flexibly form a group so as to have a configuration specified by a user. This provides a great convenience to users.

In a fourth exemplary embodiment of the present invention, after device information is collected from each STA in a network in a similar manner to the third embodiment described above, operation modes are swapped.

FIG. 22 illustrates an information management table produced based on device information collected by the STA 104 according to the present embodiment. The information management table illustrated in FIG. 22 is partially different in contents from that according to the third embodiment illustrated in FIG. 10.

Figure 23:
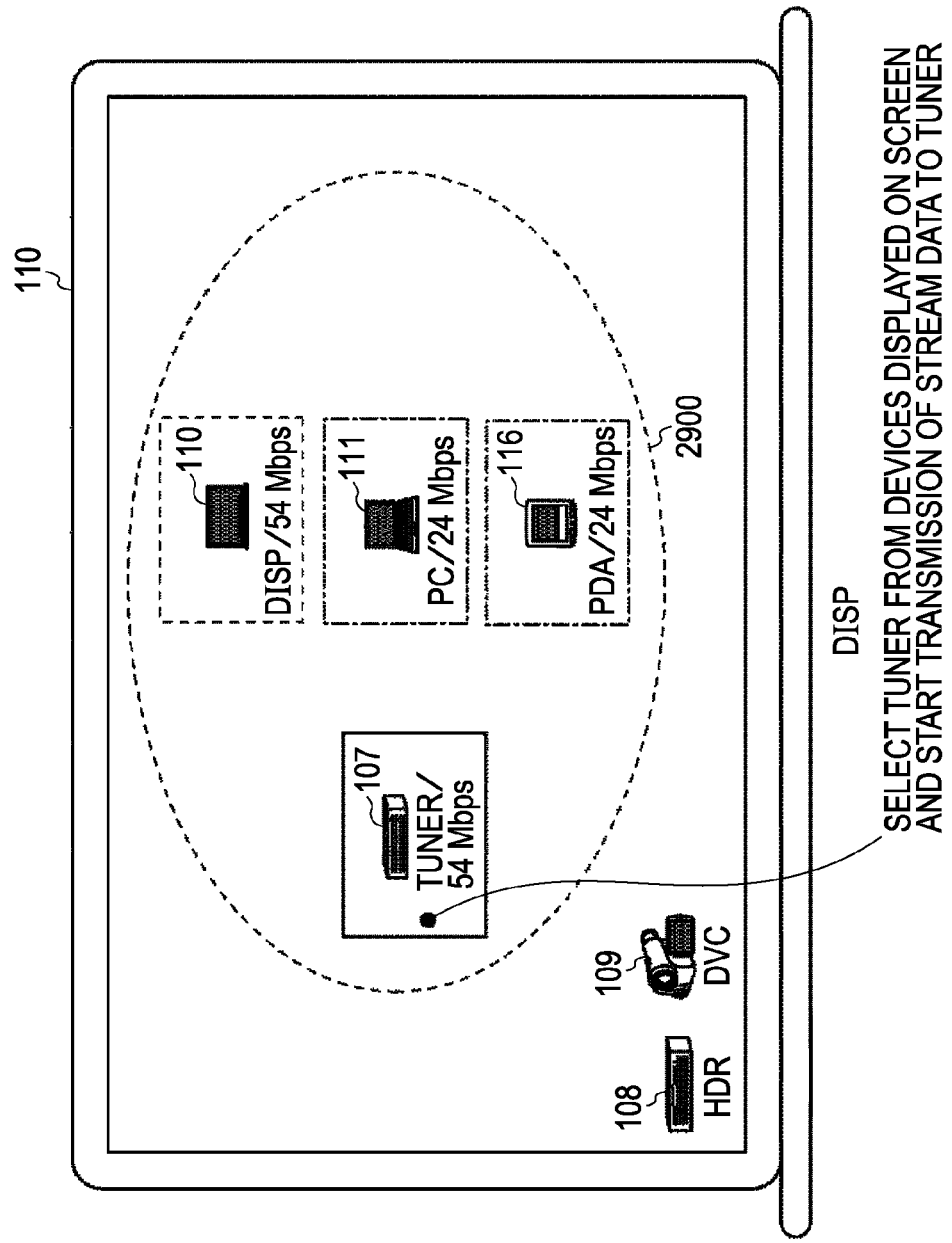
FIG. 23 is a diagram illustrating an example of an image displayed on a display screen of a television set according to an exemplary embodiment of the present invention.

FIG. 23 illustrates an example of an image which is displayed on the display screen of the television set 110 according to the display request message received from the STA 104. In this example, it is assumed that the image is displayed in a state in which device information has already been collected by the STA 104 from all STAs in the network.

In the present embodiment, in contrast to the third embodiment in which there is only one output device (i.e., the television set 110) as illustrated in FIG. 13, there is only one input device (i.e., the tuner 107). When there are a plurality of output devices and only one input device as in the present case, the input device may provide data on demand. In the on-demand service, the input device may change the transmission rate depending on the destination output device. To this end, it is desirable that the input device operate in the AP mode to achieve high-efficiency communication.

Thus, in the present embodiment, in case where the STA 104 starts its operation in the STA mode and the STA 101 starts its operation in the STA mode, the operation modes are swapped.

Figure 24:
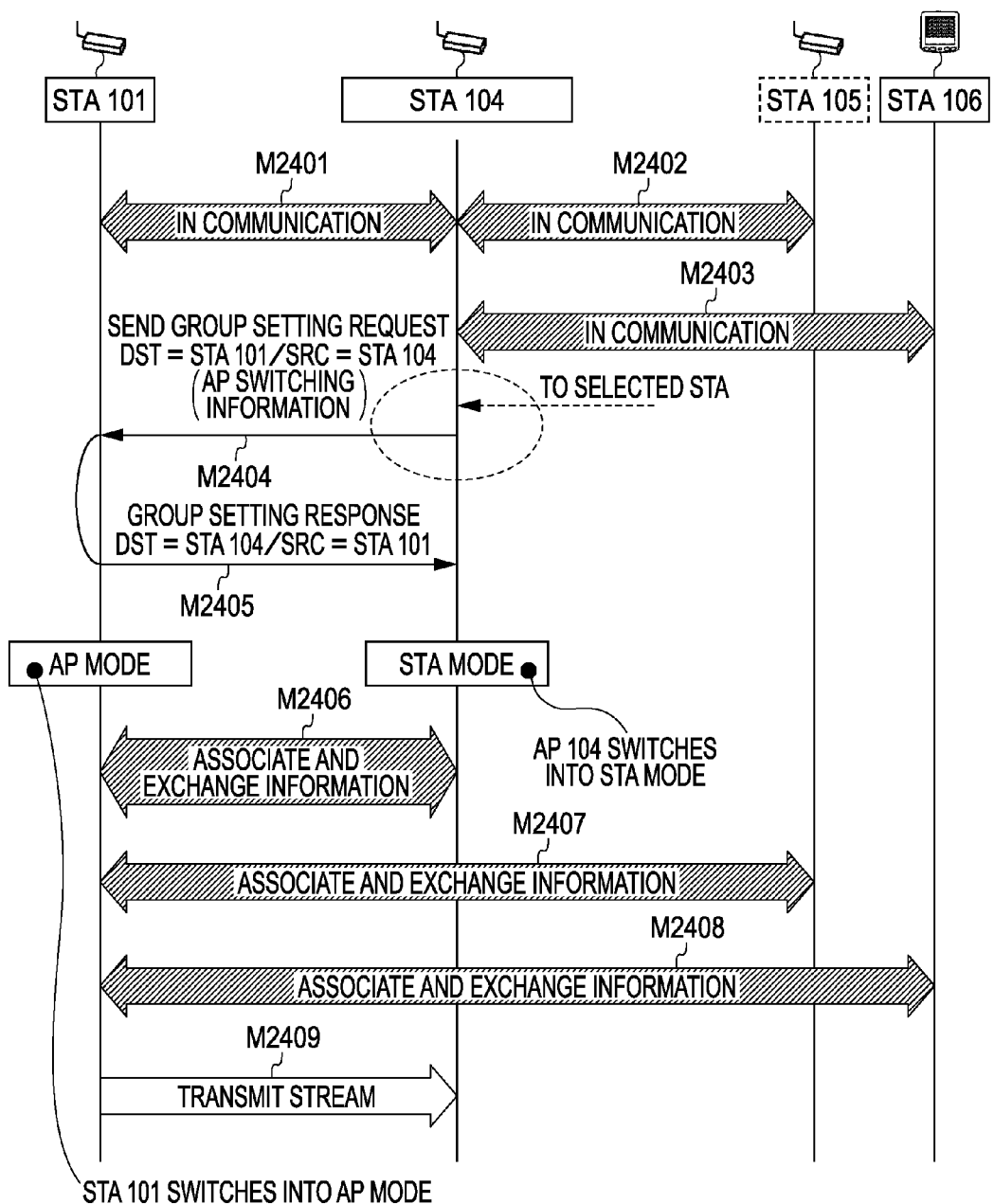
FIG. 24 illustrates an operation sequence performed by wireless communication stations according to an exemplary embodiment of the present invention.

FIG. 24 illustrates an operation sequence performed by STAs after a group is formed via a sequence similar to that illustrated in FIG. 12.

In the formed group, communication is being performed between the STA 104 operating in the AP mode and the STAs 101, 105, and 106 operating in the STA mode (M2401, M2402, and M2403).

In this state, if a user selects the tuner 107 on the display screen of the television set 110 and issues a mode swapping command, then the STA 104 sends a group setting request to the STA 101 connected to the tuner 107 (M2404).

In this specific case, in order to request the STA 101 to switch into the AP mode, "AP" is specified in the operation mode information of the group setting request sent to the STA 101. After swapping of the operation mode between the STA 101 and the STA 104 is completed, the STA 105 and the STA 106 need to re-associate with the STA 101. Thus, when the STA 104 sends the group setting request to the STA 101, the STA 104 saves the ESSID and the channel being currently used in the group communication.

If the STA 101 receives the group setting request, the STA 101 returns a group setting response to the STA 104 (M2405) and switches into the AP mode.

If the STA 104 receives the group setting response, the STA switches into the STA mode. Thereafter, the STAs 104 to 106 associate with the STA 101 now operating in the AP mode (M2406, M2407, and M2408). Thereafter, transmission of stream data from the STA 101 to the STA 104 is performed (M2409).

In the present embodiment, the operation has been described for the case where there are three output devices and only one input device. When there are two or more input devices and/or when there are a different number of output devices from the number of output devices in the above-described example, the operation mode may be automatically switched depending on the number of devices. For example, when the number of input devices is smaller than a predetermined value compared with the number of output devices, the operation mode may be switched such that one of the plurality of input devices operates in the AP mode.

In the present embodiment, as described above, after a network independent of an existing network is formed, it is allowed to change operation modes in the network. This makes it possible to adaptively change the network configuration depending on the communication capabilities of STAs and the types of devices connected to the respective STAs.

In the embodiments described above, when a user selects an STA on a display screen, a group with the selected STA is formed. However, the timing of forming a group is not limited to that described in the above embodiments. For example, when available communication band becomes insufficient or when a large delay occurs in transmission of stream data, a new group may be automatically formed between STAs being currently communicating with each other.

In the embodiments described above, it is assumed that frames of messages used in group setting are according to the specifications of management frames in the MAC layer defined in the IEEE802.11 standard. Alternatively, messages may be transmitted using data frames in the application layer according to the IEEE802.11 standard.

The features of the present invention may also be achieved by supplying a storage medium, on which a software program implementing one or more functions according to one of or a mixture of above-described embodiments is stored, to a system or an apparatus whereby a computer (CPU or MPU) in the system or apparatus reads and executes the program code stored on the storage medium.

In this case, it should be understood that the program code read from the storage medium implements the functions of the embodiment of the present invention and thus the storage medium storing the program code falls within the scope of present invention.

Specific examples of storage media which can be employed in the present invention to supply the program code include a floppy disk, a hard disk, an optical disk, a magneto-optical disk, a CD-ROM disk, a CD-R disk, a magnetic tape, a nonvolatile memory card, and a ROM.

One or more functions according to one of or a mixture of above-described embodiments according to the present invention may be implemented not only by executing the program code on a computer, but part or all of the process may be performed by an operating system or the like running on the computer in accordance with a command issued by the program code. Such implementation of the functions also falls within the scope of the present invention.

Furthermore, one or more functions according to one of or a mixture of above-described embodiments according to the present invention may be realized in such a manner that a program code is loaded from a medium such as a storage medium into a memory on an extension board inserted in a computer or into a memory in an extension unit connected to a computer, and a CPU provided on the extension board or in the extension unit executes all or part of the process in accordance with the program code. The realization in such a manner also falls within the scope of the present invention.

As described above with reference to embodiments, the present invention makes it possible to form a new network separately from an existing network as required, for example, when a communication band in the existing network becomes insufficient. When communication using the newly formed network is ended, STAs are allowed to return back into the original network. In a newly formed network, a further separate network may be formed between particular STAs. Thus, flexible grouping in a network is possible depending on a change in network status, capabilities of STAs, types of devices, etc.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-174134 filed Jun. 23, 2006, which is hereby incorporated by reference herein in its entirety.

What is claimed is:

1. A communication system, comprising:
 a control apparatus configured to control communication in a first network; and
 a plurality of communication apparatuses, wherein each communication apparatus includes a first operation mode in which the communication apparatus is configured to control communication of other communication apparatuses and a second operation mode in which the communication apparatus is configured to operate under the control of another communication apparatus,
 wherein the plurality of communication apparatuses includes at least a first communication apparatus and a second communication apparatus,
 wherein the first communication apparatus includes:
  an instructing unit configured to instruct the second communication apparatus which is associated with the first network to operate in one of the first operation mode and in the second operation mode in a second network,
  a first network configuration unit configured to configure the second network with the second communication apparatus by setting, based on an operation mode instructed by the instructing unit to the second communication apparatus, the first communication apparatus to operate in one of the first operation mode and in the second operation mode in the second network, and
  a first re-associating unit configured to re-associate with the first network when a predetermined communication in the second network configured by the first network configuration unit terminates,
 wherein the second communication apparatus includes:
  an instruction detecting unit configured to detect an instruction specifying an operation mode in the second network given by the first communication apparatus, while the second communication apparatus is associated with the first network and is configured to communicate under the control of the control apparatus,
  a second network configuration unit configured to configure the second network with the first communication apparatus by setting, in accordance with the instruction detected by the instruction detecting unit, the second communication apparatus to operate in one of the first operation mode and in the second operation mode in the second network, and a second re-associating unit configured to re-associate with the first network when a predetermined communication in the second network configured by the second network configuration unit terminates.

2. A communication apparatus
including a first operation mode in which the communication apparatus is configured to control communication of at least one other communication apparatus and a second operation mode in which the communication apparatus is configured to operate under the control of the at least one other communication apparatus, the communication apparatus comprising:
a control apparatus configured to control communication in a first network;
an instructing unit configured to instruct the at least one other communication apparatus which is associated with the first network to operate in one of the first operation mode and in the second operation mode in a second network;
a network configuration unit configured to configure the second network with the at least one other communication apparatus
by setting, based on an operation mode instructed by the instructing unit to the at least one other communication apparatus, the communication apparatus to operate in one of the first operation mode and in the second operation mode in the second network; and
a re-associating unit configured to re-associate with the first network when a predetermined communication in the second network configured by the network configuration unit terminates.

3. The communication apparatus according to claim 2, further comprising a requesting unit configured to request the second communication apparatus to perform setting for configuring the second network.

4. The communication apparatus according to claim 3, wherein the communication apparatus sets into the first operation mode or the second operation mode in accordance with a response to the request.

5. The communication apparatus according to claim 3, wherein the communication apparatus sets into the first operation mode or the second operation mode without waiting for a response to the request.

6. The communication apparatus according to claim 2, wherein the communication apparatus transmits a communication parameter used in communication in the second network to the at least one other communication apparatus.

7. The communication apparatus according to claim 2, wherein if configuring of the second network fails, the communication apparatus returns to the first network.

8. The communication apparatus according to claim 2, wherein after the second network is configured, an operation mode of the communication apparatus is swapped with an operation mode of the at least one other communication apparatus.

9. The communication apparatus according to claim 2, further comprising:
a device type detecting unit configured to detect a device type of a device connected to the communication apparatus; and
a requesting unit configured to request another communication apparatus present in the first network to perform setting for configuring the second network depending on the device type detected by the device type detecting unit,
wherein the second network is configured depending on a response to the request.

10. The communication apparatus according to claim 9, further comprising:
an acquisition unit configured to acquire information associated with a device connected to at least one communication apparatus present in the first network, in accordance with a response to the request; and
a display control unit configured to display the information associated with the device acquired by the acquisition unit.

11. A communication apparatus including a first operation mode in which the communication apparatus is configured to control communication of at least one other communication apparatus and a second operation mode in which the communication apparatus is configured to operate under the control of the at least one other communication apparatus, the communication apparatus comprising:
a control apparatus configured to control communication in a first network;
an instruction detecting unit configured to detect an instruction specifying an operation mode in the second network given by the at least one other communication apparatus, while the communication apparatus is associated with the first network and is configured to communicate under the control of the control apparatus;
a network configuration unit configured to configure the second network with the at least one other communication apparatus
by setting, in accordance with the instruction detected by the instruction detecting unit, the communication apparatus to operate in one of the first operation mode and in the second operation mode in the second network; and
a re-associating unit configured to re-associate with the first network when a predetermined communication in the second network configured by the network configuration unit terminates.

12. A method for a communication apparatus, the communication apparatus including a first operation mode in which the communication apparatus is configured to control communication of at least one other communication apparatus and a second operation mode in which the communication apparatus is configured to operate under the control of the at least one other communication apparatus, the method comprising:
controlling communication in a first network;
instructing the at least one other communication apparatus which is associated with the first network to operate in one of the first operation mode and
in the second operation mode in a second network;
configuring the second network with the at least one other communication apparatus by setting, based on the operation mode instructed to the at least one other communication apparatus,
the communication apparatus to operate in one of the first operation mode and in the second operation mode in the second network; and
re-associating with the first network when a predetermined communication in the configured second network terminates.

13. A non-transitory computer-readable storage medium storing computer-executable process steps, the computer-executable process steps causing a computer to execute the method of claim 12.

* * * * *